(12) United States Patent
Nozawa et al.

(10) Patent No.: US 7,317,794 B2
(45) Date of Patent: Jan. 8, 2008

(54) ENCIPHERING AND DECIPHERING APPARATUS, AND ENCIPHERING AND DECIPHERING METHOD

(75) Inventors: Hiroshi Nozawa, Uji (JP); Masao Takayama, Kyoto (JP); Yoshikazu Fujimori, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 862 days.

(21) Appl. No.: 10/378,982

(22) Filed: Mar. 3, 2003

(65) Prior Publication Data

US 2004/0047465 A1 Mar. 11, 2004

(30) Foreign Application Priority Data

Sep. 9, 2002 (JP) .............................. 2002-263311

(51) Int. Cl.
*H04L 9/28* (2006.01)

(52) U.S. Cl. ............................ 380/28; 380/29; 380/30; 708/490; 708/491; 708/492

(58) Field of Classification Search ............. 380/28–30, 380/268; 713/171, 174, 189; 708/490–492, 708/135

See application file for complete search history.

(56) References Cited

U.S. PATENT DOCUMENTS 3,988,538 A * 10/1976 Patten ........................ 380/268
5,031,132 A * 7/1991 Dolazza ...................... 708/315
5,987,131 A * 11/1999 Clapp ......................... 713/171
6,038,581 A * 3/2000 Aoki et al. .................. 708/492
6,430,588 B1 * 8/2002 Kobayashi et al. ......... 708/492
7,069,287 B2 * 6/2006 Paar et al. ................... 708/492
7,088,821 B2 * 8/2006 Shaik ........................... 380/30

* cited by examiner

*Primary Examiner*—Kim Vu
*Assistant Examiner*—Yin-Chen Shaw
(74) *Attorney, Agent, or Firm*—Hogan & Hartson LLP

(57) ABSTRACT

The present invention aims at providing a novel enciphering and deciphering apparatus and an enciphering and deciphering method related thereto, which are respectively capable of contracting the time required for enciphering and deciphering processes and decreasing the number of logic gates provided in the apparatus. Essentially based on an equation $X_k^i = 1 + \Sigma((J=1, i)_i C_j \cdot X_{k-1}^j)$ and also based on an initial value consisting of a group of power raising values $X_{k0}^j$ corresponding to j=1 through m in relation to k−1=k0, an arithmetic operating unit 21 seeks a second expression $Y_{k1}$ by serially computing a group of power raising values $X_k^i$ corresponding to i=1 through m in relation to one unit of k shown in the above equation in a range from k=k0+1 up to k=k1 by applying binomial coefficients stored in a coefficient memory unit 17. Accordingly, once those binomial coefficients corresponding to predetermined integers n and m are stored in memory, thenceforth, it is possible to contract the time required for executing an enciphering or deciphering process related to identical integers n and m.

4 Claims, 21 Drawing Sheets

| PLAIN TEXTS | INPUT NUMBERS |
|---|---|
| 5 ($M_5$) | 1 |
| 7 ($M_7$) | 2 |
| 5 ($M_5$) | 3 |
| 3 ($M_3$) | 4 |
| ⋮ | ⋮ |

B

| PLAIN TEXTS | INPUT NUMBERS |
|---|---|
| 3 ($M_3$) | 4 |
| 5 ($M_5$) | 1 |
| 5 ($M_5$) | 3 |
| 7 ($M_7$) | 2 |
| ⋮ | ⋮ |

| CIPHER TEXTS | INPUT NUMBERS |
|---|---|
| $C_3$ | 4 |
| $C_5$ | 1 |
| $C_5$ | 3 |
| $C_7$ | 2 |
| ⋮ | ⋮ |

B

| CIPHER TEXTS | INPUT NUMBERS |
|---|---|
| $C_5$ | 1 |
| $C_7$ | 2 |
| $C_5$ | 3 |
| $C_3$ | 4 |
| ⋮ | ⋮ |

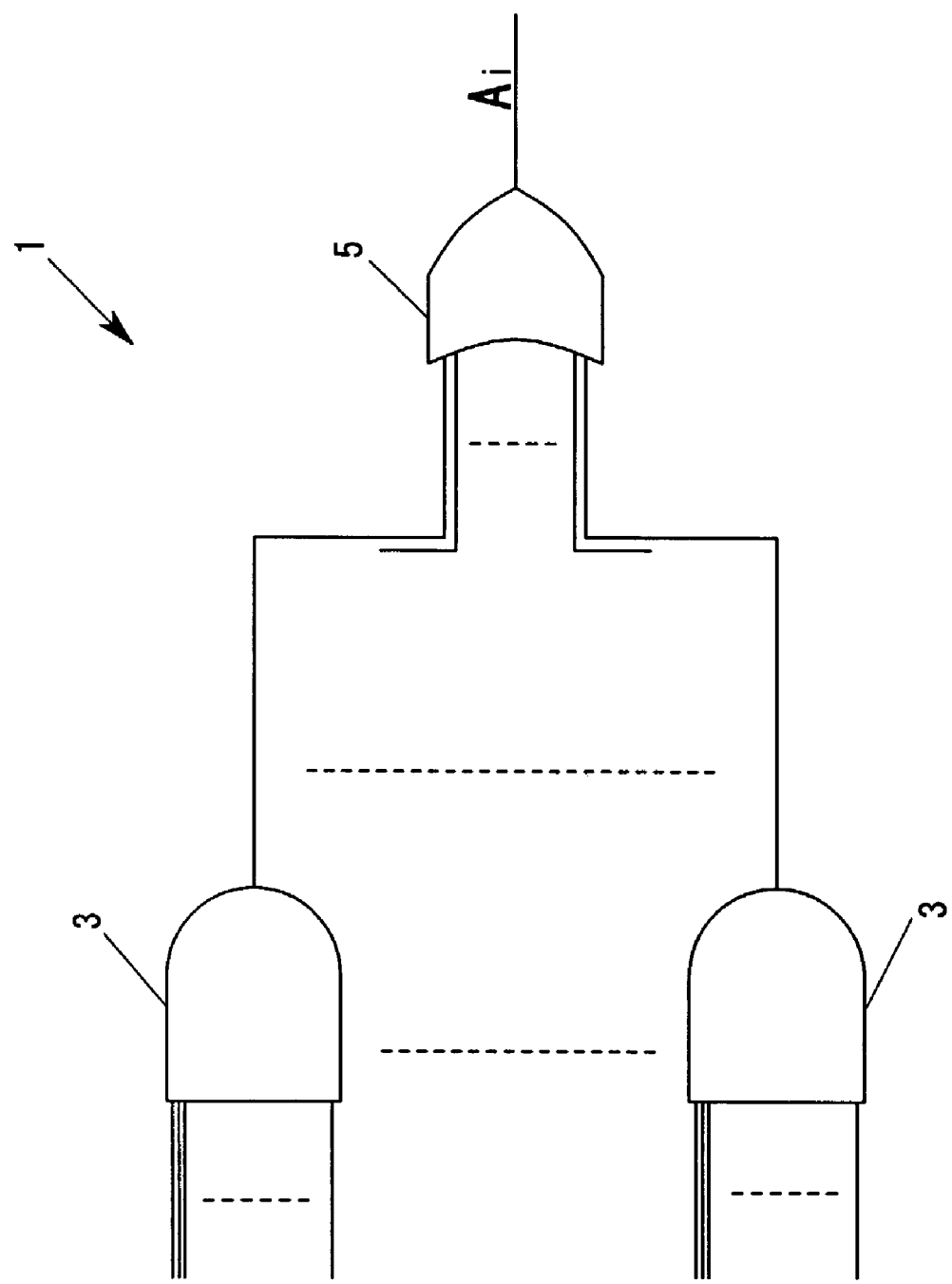

ENCIPHERING AND DECIPHERING APPARATUS, AND ENCIPHERING AND DECIPHERING METHOD

CROSS-REFERENCE TO RELATED APPLICATION

The entire disclosure of Japanese Patent Application No. 2002-263311, filed on Sep. 9, 2002, including their specification, claims, drawings, and summary, are incorporated herein by reference in its entirety.

BACKGROUND OF THE INVENTION

1. Field of the Invention

The present invention relates to an enciphering and deciphering apparatus and also an enciphering and deciphering method. In particular, the present invention relates to an art of seeking a second expression $Y_{k1}$ defined by an equation $Y_{k1} = X_{k1}{}^m$ (where m is a positive integer) based on a first expression $X_{k1}$ corresponding to an optional positive integer $X_k = X_{k1}$ satisfying an expression shown below in a mathematical system in which modulo n of positive integer is present:

$$X_k = X_{k-1} + 1 (1 <= k <= n-1, X_0 = 0)$$

2. Description of a Prior Art

As one of cryptographic techniques, the "RSA" (Rivets, Shimmer, Alderman public key method) cryptographic system is known. In a process for dealing with the RSA ciphers, using a public key (n, e) comprising "n" corresponding to a product of a pair of optional prime numbers "p" and "q" and an optional number "e" satisfying specific restriction against the prime numbers "p" and "q", in accordance with an equation shown below, a cipher text C is generated by way of enciphering a plain text M:

$$C = M^e (\mathrm{mod}\ n)$$

On the other hand, using a secret key (n, d) comprising a number "d" unilaterally led from the above-referred optional number "e" and prime numbers "p" and "q", in accordance with an equation shown below, the cipher text C is deciphered before eventually generating a plain text M:

$$M = C^d (\mathrm{mod}\ n)$$

In this case, if a third party is enabled to secure the prime numbers "p" and "q" by factorizing "n" of the public key (n, e) into prime factors, then, based on the number "e" and the prime numbers "p" and "q", he or she will be able to become acquainted with the above number "d" very easily before eventually securing the secret key (n, d).

Nevertheless, if the value of the above-referred "n" is enhanced, it will in turn require an enormous time to execute factorization of "n" into prime factors necessary for seeking the prime numbers "p" and "q", thus making it practically impossible to execute a cryptanalysis. In the RSA cryptographic system, based on the above method by way of enhancing the value of "n", security of cryptography is ensured.

On the other hand, the above conventional RSA cryptographic system still has problems to solve as cited below. Concretely, when executing a ciphering process, it is required to execute multiplications by e-times per plain text M. Likewise, it is also required to execute multiplications by d-times per cipher text C whenever executing a deciphering process. Accordingly, the greater the value of "n" for ensuring security, the longer the time required for executing an enciphering process and a deciphering process, thus raising problems.

To solve the above problems, it is conceived to use such an enciphering circuit solely consisting of hardware for example. FIG. 21 exemplifies a circuit 1 corresponding to one-bit of a cipher text among an enciphering circuit for converting b-bit of a plain text into b-bit of a cipher text.

The above circuit 1 comprises $2^{b-1}$ units of "b-input AND gate 3 and one unit of $2^{b-1}$ input OR gate 5. Accordingly, it is required to provide the whole enciphering circuits with a large number of logic gates corresponding to b-times those which are provided for the above circuit 1. Although introduction of the above-referred enciphering circuit will enable contraction of time required for encryption, it will in turn necessitate provision of a huge number of logic gates. The same problem is also present in the deciphering process.

On the other hand, it is also conceived to introduce a method to store all the texts previously enciphered from plain texts. According to this method, unlike the case of executing computations per input of a plain text, time required for encryption can be contracted, and yet, unlike the case of using such an enciphering circuit solely comprising hardware, provision of a huge number of logic gates can be saved. Nevertheless, the greater the value of "n", the greater the number of memory elements required for provision, and thus, there is a definite limit in the effectiveness of the above conceived method.

SUMMARY OF THE INVENTION

The object of the present invention is to provide a novel enciphering and deciphering apparatus and an enciphering and deciphering method respectively capable of fully solving problems existing in the above conventional enciphering and deciphering method, capable of contracting the time required for executing the enciphering and deciphering processes, and dispensing with provision of a huge number of memory elements and logic gates.

In a mathematic system in which modulo n of the positive integer is present, the enciphering and deciphering apparatus according to the present invention seeks a second expression $Y_{k1}$ defined by an equation $Y_{k1} = X_{k1}{}^m$ (where m is a positive integer) based on a first expression $X_{k1}$ comprising an optional positive integer $X_k = X_{k1}$ that satisfies an equation $X_k = X_{k-1}(1 <= k <= n-1, X_0 = 0)$. The enciphering and deciphering apparatus according to the present invention comprises the following: a coefficient memory unit which essentially stores the whole of binomial coefficients ${}_iC_j (1 <= i <= m, 1 <= j <= i)$ and an arithmetic operating unit which seeks a second expression $Y_{k1}$ by serially computing a group of power raising values $X_k^i$ corresponding to i=1 through m in relation to one unit of k essentially based on an equation $X_k^i = 1 + \Sigma((j=1, i)_i C_j \cdot X_{k-1}{}^j)$ by applying an initial value consisting of a group of power raising values $X_{k0}{}^j$ corresponding to j=1 through m in relation to k-1=k0 in a range from k=K0+1 up to k=k1 by applying binomial coefficients stored in the coefficient memory.

In a mathematic system in which modulo n of the positive integer is present, the enciphering and deciphering method according to the present invention seeks a second expression $Y_{k1}$ defined by an equation $Y_{k1} = X_{k1}{}^m$ (where m is a positive integer) by applying a memory unit and an arithmetic operating unit based on a first expression $X_{k1}$ consisting of an optional positive integer $X_k = X_{k1}$ that satisfies an equation $X_k = X_{k-1} + 1 (1 <= k <= n-1, X_0 = 0)$.

More particularly, the inventive enciphering and deciphering method comprises the following: a coefficient storing step for enabling the memory unit to store the whole or part of the binomial coefficient $_iC_j$ ($1<=i<=m$, $0<=j<=i$) therein; and an arithmetic operating step for seeking the second expression $Y_{k1}$ by causing said arithmetic operating unit to serially compute a group of power raising values $X_k^i$ corresponding to $i=1$ through m in relation to one unit of k essentially based on an equation $X_k^i = \Sigma((j\ 0,\ 1)_i C_j \cdot X_{k-1}^j)$ in a range from $k=k0+1$ up to $k=K1$ by applying a constant including a group of power raising values $X_{k0}^j$ corresponding to $j=1$ through m in relation to $k-1=k0$ and also applying binomial coefficients stored in the memory unit.

It should be noted that, within the scope of this specification and claims of the present invention, an expression "$a<=b$" designates that "a" is smaller than or equal to "b". Further, "$\Sigma(j=a, b)f(j))$" designates "$f(a)+f(a+1)+f(a+2)+ \ldots +f(b-1)+f(b)$". "$_iC_j$" designates "combination", i.e., it designates "$i \cdot (i-1) \cdot (i-2) \ldots (i-j+1)/j!$. This is defined as "$0^0=1$". Note further that, unless otherwise specified, all the arithmetic operations are defined within a mathematic system in which modulo n of the positive integer is present, and thus, description of (mod n) is deleted here.

Features of the present invention could be shown extensively as described above. The constitution and contents of the present invention will more fully be clarified via the following disclosure upon taking the object, features, and the accompanying drawings, into consideration.

BRIEF DESCRIPTION OF THE DRAWINGS

In the accompanying drawings;

FIG. 19A is a simplified diagram for schematically designating an example of a plurality of plain texts $M_{k1}$ stored in a main memory unit 52 before they are subject to rearrangement;

FIG. 19B is a simplified diagram for schematically designating an example of a plurality of plain texts $M_{k1}$ stored in the main memory unit 52 after completing rearrangement thereof;

FIG. 20A is a simplified diagram for schematically designating an example of a plurality of cipher texts $C_{k1}$ stored in the main memory 52 according to the output sequence;

FIG. 20B is a simplified diagram for schematically designating an example of a plurality of cipher texts $C_{k1}$ after rearranging them according to the input number: and FIG. 21 is a simplified diagram for designating an enciphering circuit solely comprising hardware.

DESCRIPTION OF THE PREFERRED EMBODIMENTS

Figure 1:
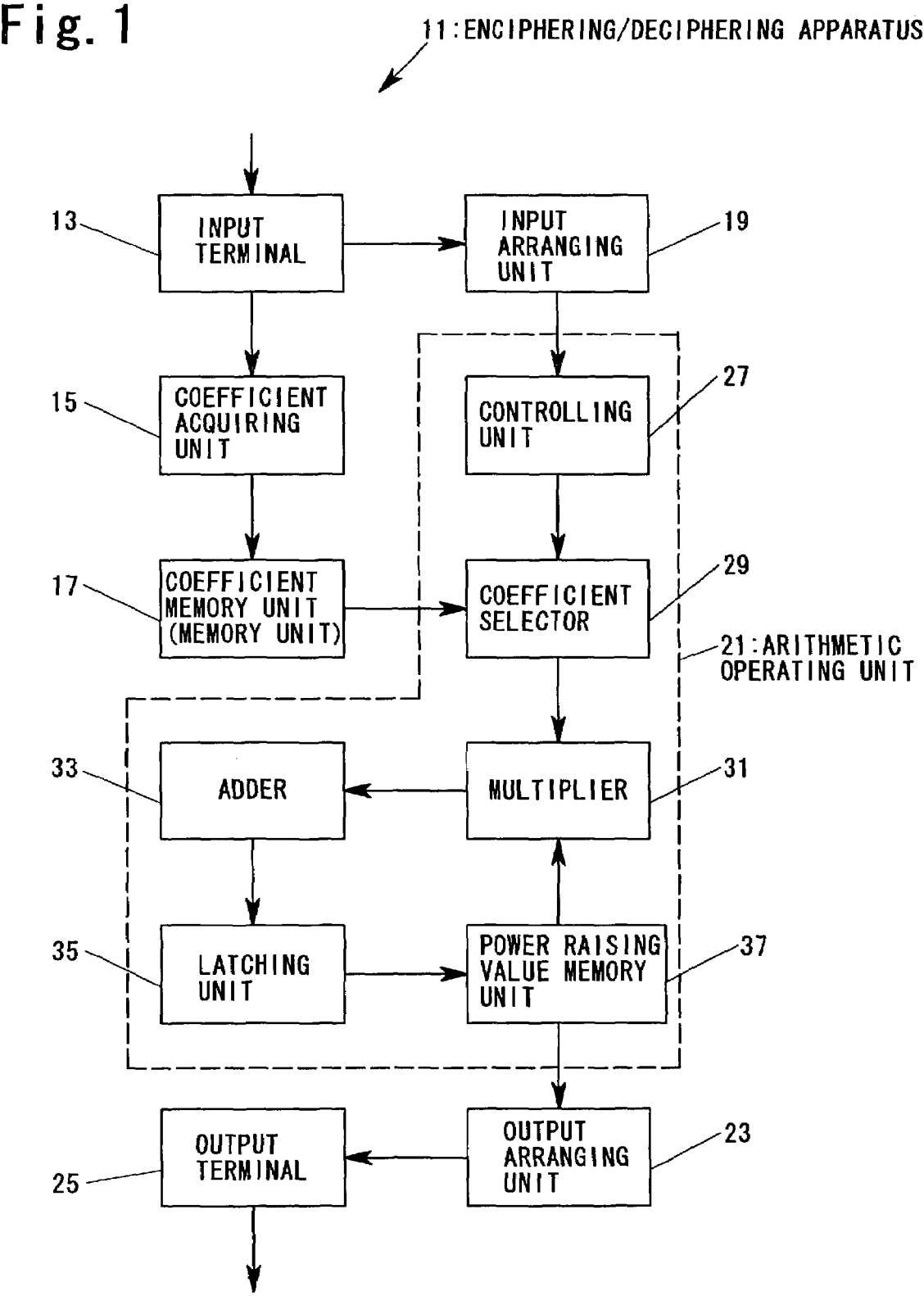
FIG. 1 is a schematic block diagram for designating the constitution of an enciphering and deciphering apparatus 11 according to a practical embodiment of the present invention.

FIG. 1 is a schematic block diagram for designating the constitution of the enciphering and deciphering apparatus 11 according to a practical embodiment of the present invention. In a mathematic system in which modulo n of the positive inter is present, assuming that a first expression consists of an optional positive integer $X_k=X_{k1}$ that satisfies an equation $X_k=X_{k-1}+1$ ($1<=k<=n-1$, $X_0=0$), based on the first expression $X_{k1}$, the enciphering and deciphering apparatus 11 seeks a second expression $Y_{k1}$ defined by an equation $Y_{k1}=X_{k1}^m$ (where m is a positive integer). For example, the enciphering and deciphering apparatus 11 is also usable for enciphering and/or deciphering the RSA ciphers.

Taking the case of enciphering and/or deciphering the RSA ciphers for example, a practical form for embodying the enciphering and deciphering apparatus 11 is described below. The enciphering and deciphering apparatus 11 comprises the following: an input terminal 13, a coefficient acquiring unit 15, a coefficient memory unit 17 as a memory unit, an input arranging unit 19, an arithmetic operating unit 21, an output arranging unit 23, and an output terminal 25.

The input terminal 13 is used for the input of predetermined integers n and m and a first expression $X_{k1}$. Based on the integers n and m input via the input terminal 13, the coefficient acquiring unit 15 essentially acquires the whole of the binomial coefficients $_iC_j$ ($1<=i<=m$, $1<=j<=i$), and then enables the coefficient memory unit 17 to store the acquired binomial coefficient therein.

The input arranging unit 19 rearranges a plurality of the first expressions $X_{k1}$ input from the input terminal 13 according to the ascending order, and then transmits them to the arithmetic operating unit 21.

Essentially based on an equation $X_k^i = 1 + \Sigma((j=1, i)_i C_j \cdot X_{k-1}^j)$, the arithmetic operating unit 21 seeks a second expression $Y_{k1}$ by serially computing a group of power raising values $X_k^i$ corresponding to i=1 through m in relation to one unit of k in the above equation in a range from k=k0+1 up to k=k1 based on an initial value consisting of a group of power raising values $X_{k0}^j$ corresponding to j=1 through m in relation to k-1=k0 by applying the binomial coefficients stored in the coefficient memory unit 17. Availing of a group of power raising values acquired on the way of computing an immediately preceding second expression, the arithmetic operating unit 21 computes an ensuing second expression.

The output arranging unit 23 rearranges a plurality of the second expressions $Y_{k1}$ computed by the arithmetic operating unit 21 in correspondence with the input sequence of the corresponding first expression $X_{k1}$. The output terminal 25 outputs the second expressions $Y_{k1}$ rearranged by the output arranging unit 23.

The above arithmetic operating unit 21 comprises the following: a controlling unit 27, a coefficient selector 29, a multiplier 31, an adder 33, a latching unit 35, and a power raising value memory unit 37.

Among those binomial coefficients stored in the coefficient memory unit 17, the coefficient selector 29 selects one or two or more than two of binomial coefficients required for computing one unit of power raising value $X_k^i$ corresponding to each one unit of k and i.

The power raising value memory unit 37 stores a group of power raising values $X_{k-1}^j$ corresponding to j=1 through m.

The multiplier 31 seeks a product of the binomial coefficients selected by the coefficient selector 29 and one or two or more than two of power raising values $X_{k-1}^j$ corresponding to the selected binomial coefficients among a group of power raising values $X_{k-1}^j$ stored in the power raising value memory unit 37.

The adder 33 seeks a sum of one or two or more than two of products sought by the multiplier 31 and a numerical value "1". The latching unit 35 latches the sum acquired by the adder 33 as a power raising value $X_k^i$ corresponding to each one unit of k and i.

The controlling unit 27 controls operations of the coefficient selector 29, the multiplier 31, the adder 33, the latching unit 35, and the power raising value memory unit 37.

More particularly, the controlling unit 27 serially computes a plurality of power raising values $X_k^i$ corresponding to i=1 through m in relation to one unit of k, and then serially latches them at the latching unit 35. Only after fully latching a group of power raising values $X_k^i$ corresponding to i=1 through m in relation to one unit of k, the controlling unit 27 transfers the group of the latched power raising values $X_k^i$ to the power raising value memory unit 37 for storage therein, and then renews the stored contents of the power raising value memory unit 37 into the group of newly computed power raising values $X_k^i$. By way of serially computing the renewed power raising values $X_k^i$ as the updated power raising values $X_{k-1}^j$, the controlling unit 27 eventually acquires the second expression $Y_{k1}$.

Figure 2:
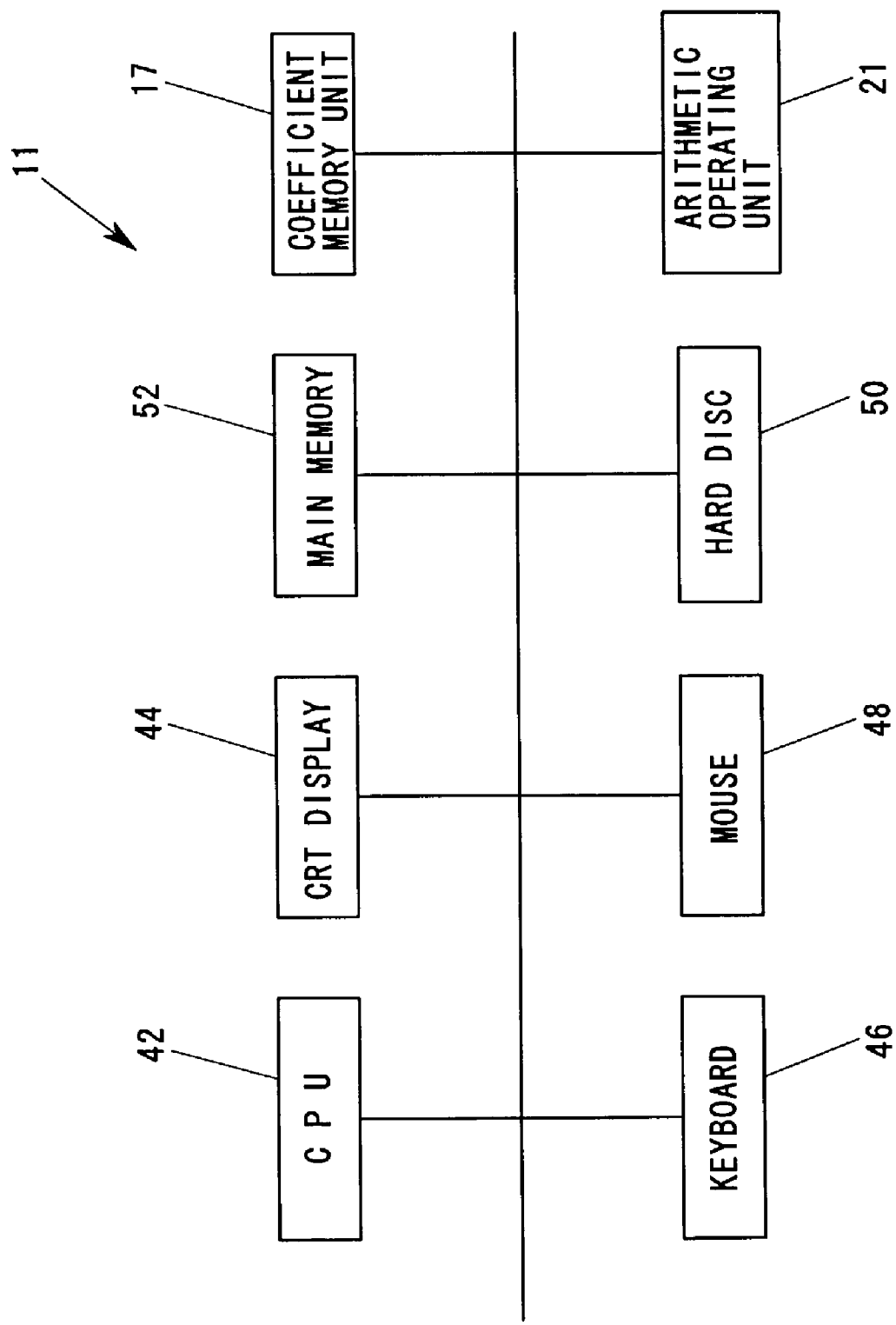
FIG. 2 is a simplified block diagram for designating an example of hardware constitution when embodying the enciphering and deciphering apparatus 11 shown in FIG. 1 by applying a computer.

FIG. 2 is a simplified block diagram for designating an example of a hardware constitution when embodying the inventive enciphering and deciphering apparatus 11 shown in FIG. 1 by applying a computer. In FIG. 2, the enciphering and deciphering apparatus 11 comprises the following: a hard disc 50 (a memory means) consisting of a recording medium storing programs for enabling a computer to function itself as the enciphering and deciphering apparatus 11; a main memory 52; a CPU 42 as a controlling means for executing the programs stored in the hard disc 50; a cathode ray tube (CRT) 44 functioning itself as a display means; a keyboard 46 and a mouse 48 for constituting input means; an arithmetic operating unit 21; and a coefficient memory unit 17.

The keyboard 46, the mouse 48, the hard disc 50, the CPU 42, and the main memory 52 shown in FIG. 2 individually correspond to the input terminal 13 shown in FIG. 1. The CRT 44, the hard disc 50, the CPU 42, and the main memory 52 individually correspond to the output terminal 25. Further, the CPU 42 and the main memory 52 respectively correspond to the coefficient acquiring unit 15, the input arranging unit 19, and the output arranging unit 23.

Figure 3:
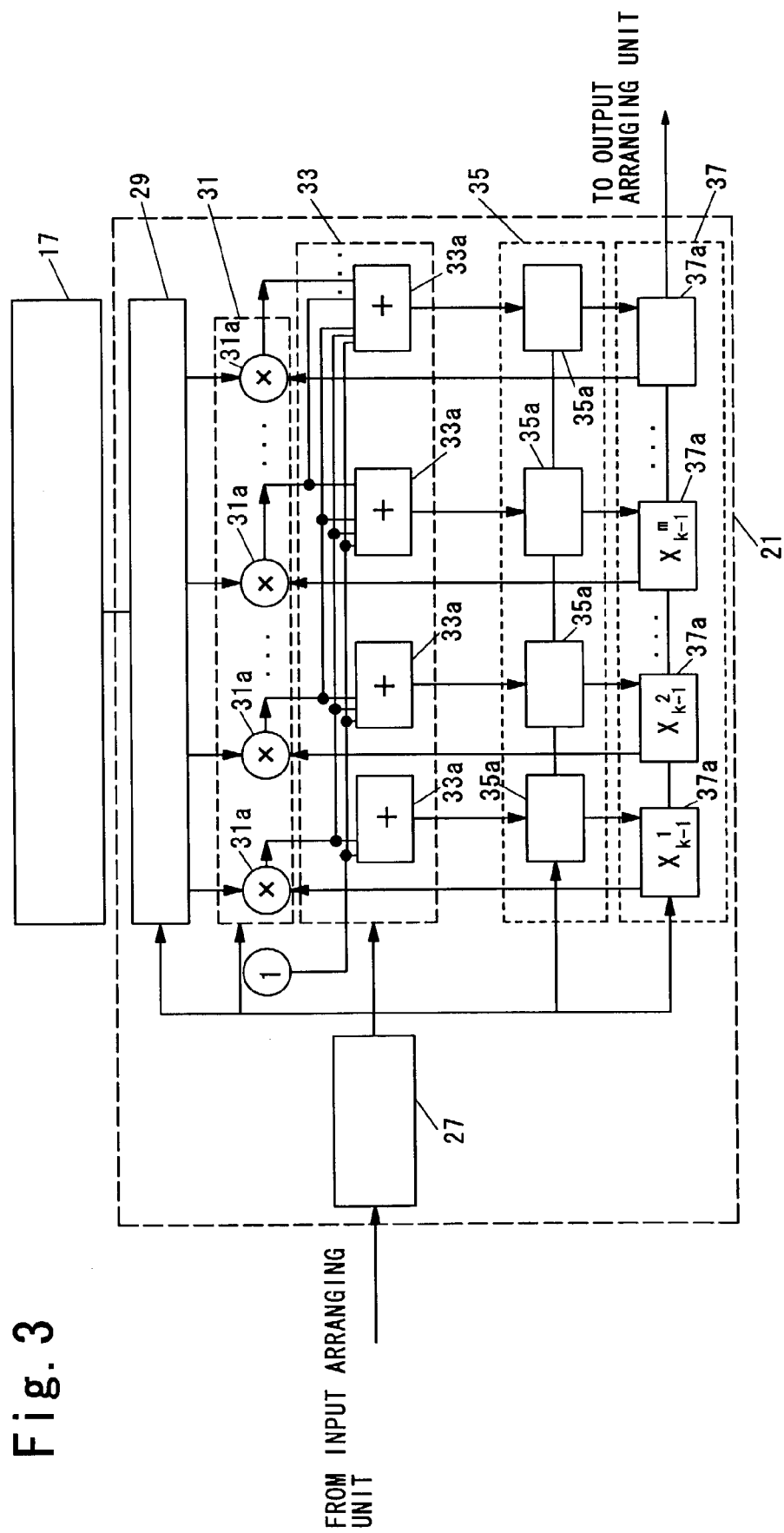
FIG. 3 is a schematic block diagram for designating an example of the constitutions of a coefficient memory unit 17 and an arithmetic operating unit 21 of FIG. 2.

FIG. 3 is a schematic block diagram for designating an example of constitutions of the coefficient memory unit 17 and the arithmetic operating unit 21 shown in FIG. 2. The coefficient memory unit 17 and the arithmetic operating unit 21 are respectively built in a computer loaded on a printed circuit board (not shown) in the form of one or two or more than two of large-scale integrated circuits (LSI) for example. As shown in FIG. 3, the arithmetic operating unit 21 comprises the coefficient selector 29, the multiplier 31, the adder 33, the latching unit 35, the power raising value memory unit 37, and the controlling unit 27.

The coefficient selector 29 is embodied in the form of an address decoding circuit for example. When representing an integer n by an expression "$n \approx 2^b$" for example, the adder 31 is formed with at least m-units of b-bit multipliers 31a (i.e., multiplying circuits). Note that the multiplying circuit may simply be referred to as a multiplier 31a in the following description. Likewise, the adder 33 is formed with at least m-units of b-bit adders 33a (i.e., adding circuits). This may also simply be referred to as an adder 33a in the following description.

The latching unit 35 and the power raising value memory unit 37 are respectively formed with at least m-units of b-bit RAM circuits. These RAM circuits may simply be referred to as a "RAM 35a for latching use" and a "RAM 37a for memory use" in the following description. The controlling unit 27 is composed of hardware logics and/or software.

Figure 4:
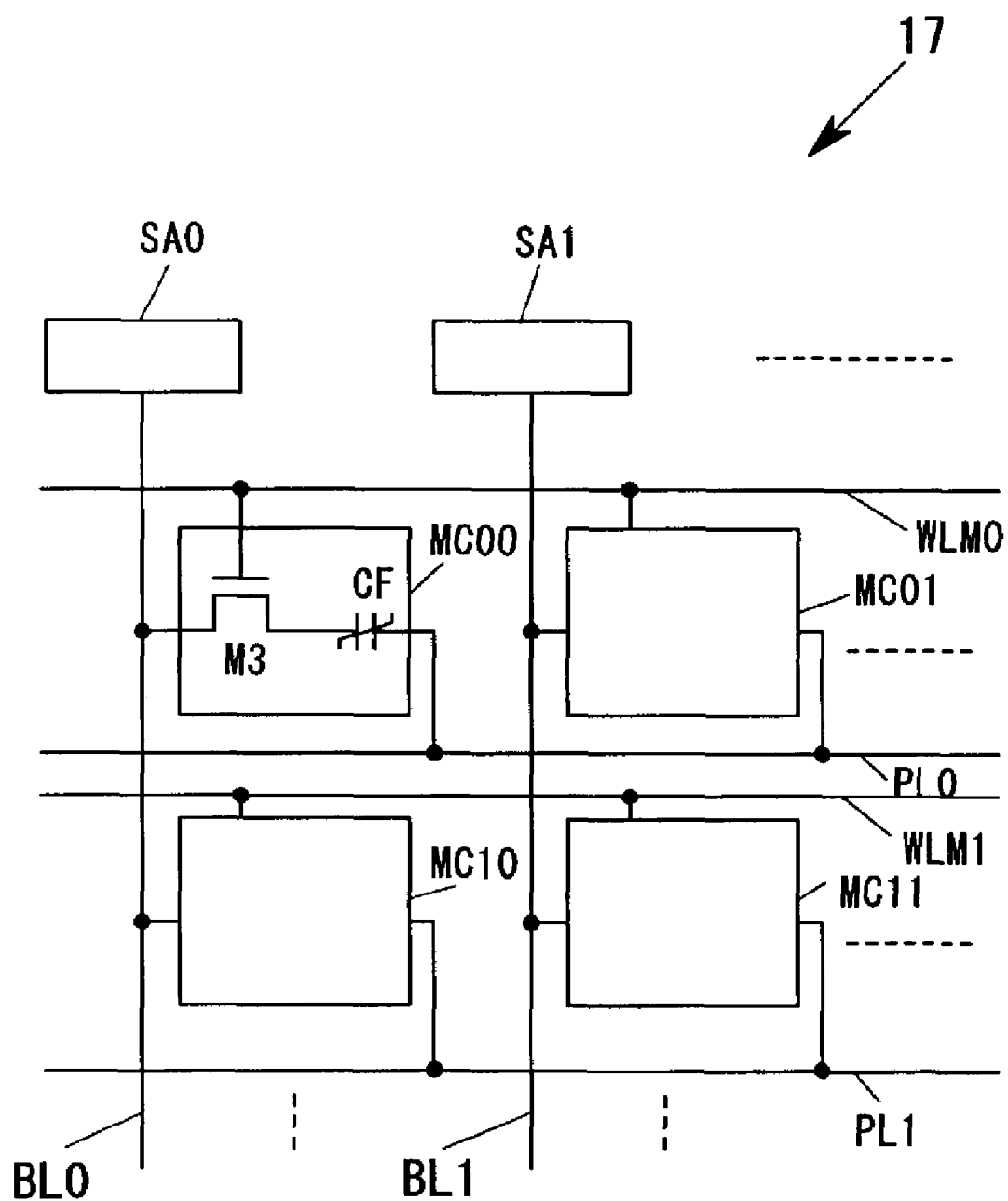
FIG. 4 is a diagram for designating part of an example of the constitution of the coefficient memory unit 17 shown in FIG. 3.

FIG. 4 is a schematic block diagram for designating part of an example of the constitution of the coefficient memory unit 17 shown in FIG. 3. In this example, the coefficient memory unit 17 is formed with a plurality of matricially disposed memory cells MC00, MC01, . . . . For example, the memory cell MC00 constitutes a circuit for storing data by applying memory elements. The memory cell MC00 comprises a ferroelectric capacitor CF functioning itself as a memory element and a transistor M3 functioning itself as a memory selecting element. Any of the remaining memory cells is also formed with the same constitution. The memory cell consisting of a ferroelectric memory element may be referred to as a "ferroelectric random access memory (FeRAM)".

The coefficient memory unit 17 further incorporates bit lines BL0, BL1, . . . respectively for selecting a column, memory-use word lines WLM0, WLM1, . . . respectively for selecting a row for memories, plate lines PL0, PL1, . . .

respectively for selecting a row, and sense amplifiers SA0, SA1, . . . which respectively constitute a rated potential generating circuit.

In order to select a memory cell belonging to an identical column of the coefficient memory unit 17, the bit lines BL0, BL1, . . . are respectively disposed in correspondence with individual columns of the coefficient memory unit 17. Further, in order to select a memory cell belonging to an identical row of the coefficient memory unit 17, the word lines WLM0, WLM1, . . . are respectively disposed in correspondence with individual rows of the coefficient memory unit 17.

In order to enable the plate lines PL0, PL1, . . . to be solely connected to a ferroelectric capacitor CF for constituting a memory cell belonging to an identical row of the coefficient memory unit 17, these plate lines are disposed in correspondence with individual rows of the coefficient memory unit 17.

For example, in the course of writing and reading data into and out from the ferroelectric capacitor CF, the plate line PL0 adds a rectangular pulse signal to the ferroelectric capacitor CF, where the rectangular pulse signal bears predetermined potentials including "H" potential (i.e., power-source potential VDD) and "L" potential (i.e., ground potential GND) alternating each other.

The sense amplifiers SA0, SA1, . . . are individually connected to the bit lines BL0, BL1, . . . , where these sense amplifiers individually generate a rated potential compatible with the corresponding data in the course of reading data out from the ferroelectric capacitor CF.

For example, the sense amplifier SA0 is connected to the bit line BL0. When reading data out from the ferroelectric capacitor CF, the sense amplifier SA0 generates "H" potential (i.e., power-source potential VDD) being rated against the corresponding data or "L" potential (i.e., ground potential GND). Any of the remaining sense amplifiers is also provided with the same constitution.

The number of memory cell for constituting the coefficient memory unit 17 is not restricted in particular. Insofar as the number of the provided memory cells enables them to store essentially the whole of binomial coefficients $_iC_j$ ($1<=i<=m$, $1<=j<=i$), no problem will be generated.

More particularly, in terms of the number of memory cell, provision of the memory cells capable of storing b-bit binomial coefficients by m·(m+1)/2 units (i.e., b·m·(m+1)/2 units) will be quite enough. However, even when the number of the provided memory cells is less than the indicated number, insofar as they can store essentially the whole of the binomial coefficient $_iC_j$($1<=i<=m$, $1<=j<=i$), it does not constitute a critical problem.

For example, even when there are merely b·m·(m−1)/4 units of the memory cells, no problem will be generated. This is because it is not required to necessarily provide a memory area for the binomial coefficient $_iC_j$ whose value becomes 1, and yet, because it is allowable to form a memory area for either of the binomial coefficients $_iC_j$ and $_iC_{i-j}$ that will become a certain value identical to each other.

Figure 5:
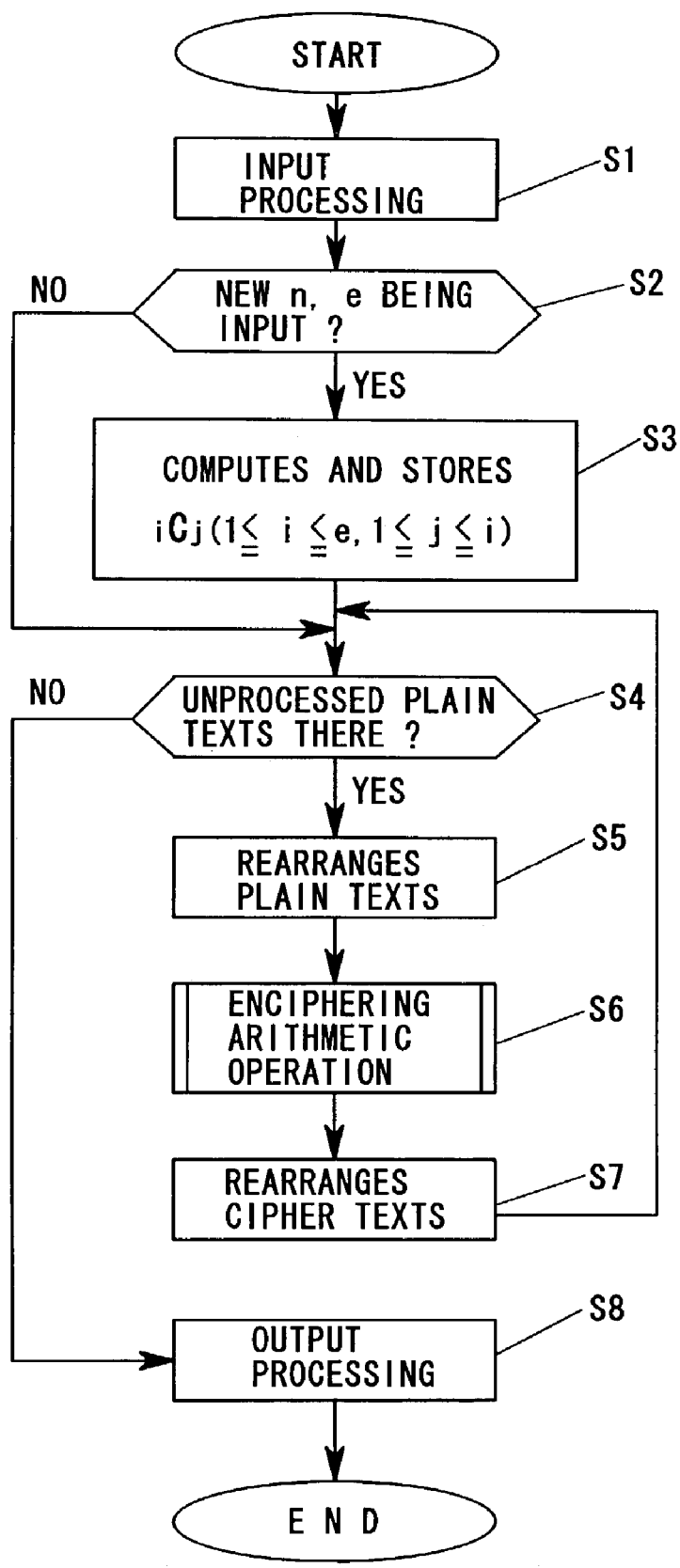
FIG. 5 is a flowchart for designating an example of serial processes when executing an enciphering process based on the RSA cryptographic system by applying the enciphering and deciphering apparatus 11.

FIG. 5 presents a flowchart for designating serial steps in the course of executing enciphering processes based on the RSA cryptographic system by applying the enciphering and deciphering apparatus 11. A plain text M, a cipher text C, and an integer e for constituting a public key (n, e) in the enciphering process based on the RSA cryptographic system correspond respectively to the above-referred first expression X, the second expression Y, and the integer m shown therein.

Initially, the CPU 42 shown in FIG. 2 executes an input process while step S1 is entered. In step S1, upon the input of the integers n and e for constituting the public key (n, e) of the RSA cipher via the keyboard 46 and the mouse 48, the CPU 42 enables the main memory 52 to store them therein.

When arrays of characters to be subject to encryption are input via the keyboard 46 and the mouse 48, the CPU 42 rearranges the input data into predetermined numerical arrays, in other words, converts them into one or two or more than two of plain texts $M_{k1}$, and then enables the main memory unit 52 to store them therein. It is of course allowable to input numerical arrays corresponding to the plain text $M_{k1}$ directly from the keyboard 46 and the mouse 48.

FIG. 19A presents a simplified schematic block diagram of an example of the state of the plain text $M_{k1}$ stored in the main memory 52. As shown here, when storing the plain text $M_{k1}$ in the main memory 52, it is so arranged that the plain text $M_{k1}$ can be stored in relation to the input numbers designating the input sequence. In this example, a plurality of plain texts "5", "7", "5", "3", are stored in the main memory 52 in relation to the input numbers "1", "2", "3", "4", . . . .

Input of the plain texts into the main memory 52 is not solely restricted to the case of using the keyboard 46 and the mouse 48, but, for example, it is also possible to read the plain texts from the hard disc 50 or via a communication network (not shown) as well.

Next, step S2 is entered, in which the CPU 42 identifies whether a new public key (n, e) has been input or not.

If it is identified that a new public key (n, e) has been input, based on the input public key (n, e), the CPU 42 computes essentially the whole of binomial coefficients $_iC_j$($1<=i<=e$, $1<=j<=i$), and then enables the coefficient memory unit 17 to store the computed result therein. This corresponds to step S3. In this case, it is not always necessary to compute the binomial coefficient $_iC_j$ whose value becomes 1. It is also allowable to compute either of the binomial coefficients $_iC_j$ and $_iC_{i-j}$ which will become a certain value identical to each other. The step S3 corresponds to the coefficient-storing step.

If it is identified that a new public key (n, e) has not been input while step S2 is underway, then, the CPU 42 shifts the operating mode to step S4 without executing step S3.

Next, while step S4 is entered, the CPU 42 identifies whether the main memory 52 still retains a plain text $M_{k1}$ without being processed via the ensuing steps S5 through S7, or not. If the CPU 42 identifies in step S4 that the main memory 52 still holds the unprocessed plain texts $M_{k1}$, then, the CPU 42 extracts a predetermined number of plain texts $M_{k1}$ based on the sequence of input numbers out from the unprocessed plain texts $M_{k1}$, and then, step S5 is entered, in which the CPU 42 rearranges them according to the ascending order.

The number of plain texts subject to rearrangement is not restricted in particular, but it is allowable to designate all the input plain texts $M_{k1}$ as the object of rearrangement. It should be understood that, if there are too many of the plain texts $M_{k1}$ subject to rearrangement, it will take too much time for the rearrangement to result in the prolonged duration to rearrange all of them. In this case, it is desired that the number of the plain texts $M_{k1}$ subject to rearrangement all at once be limited so as to treat them for two times or more.

FIG. 19B is a simplified block diagram for schematically designating an example of the state of the plain texts $M_{k1}$ in the main memory after completing the rearrangement of the whole thereof. As shown here, a predetermined number of the plain texts are stored in the main memory 52 after being rearranged into the ascending orders "3", "5", "5", "7", for example. In this case, those plain texts are stored in the main memory 52 without losing the relationship between the plain texts and the corresponding input numbers. The step S5 corresponds to the input arranging step.

Figure 6:
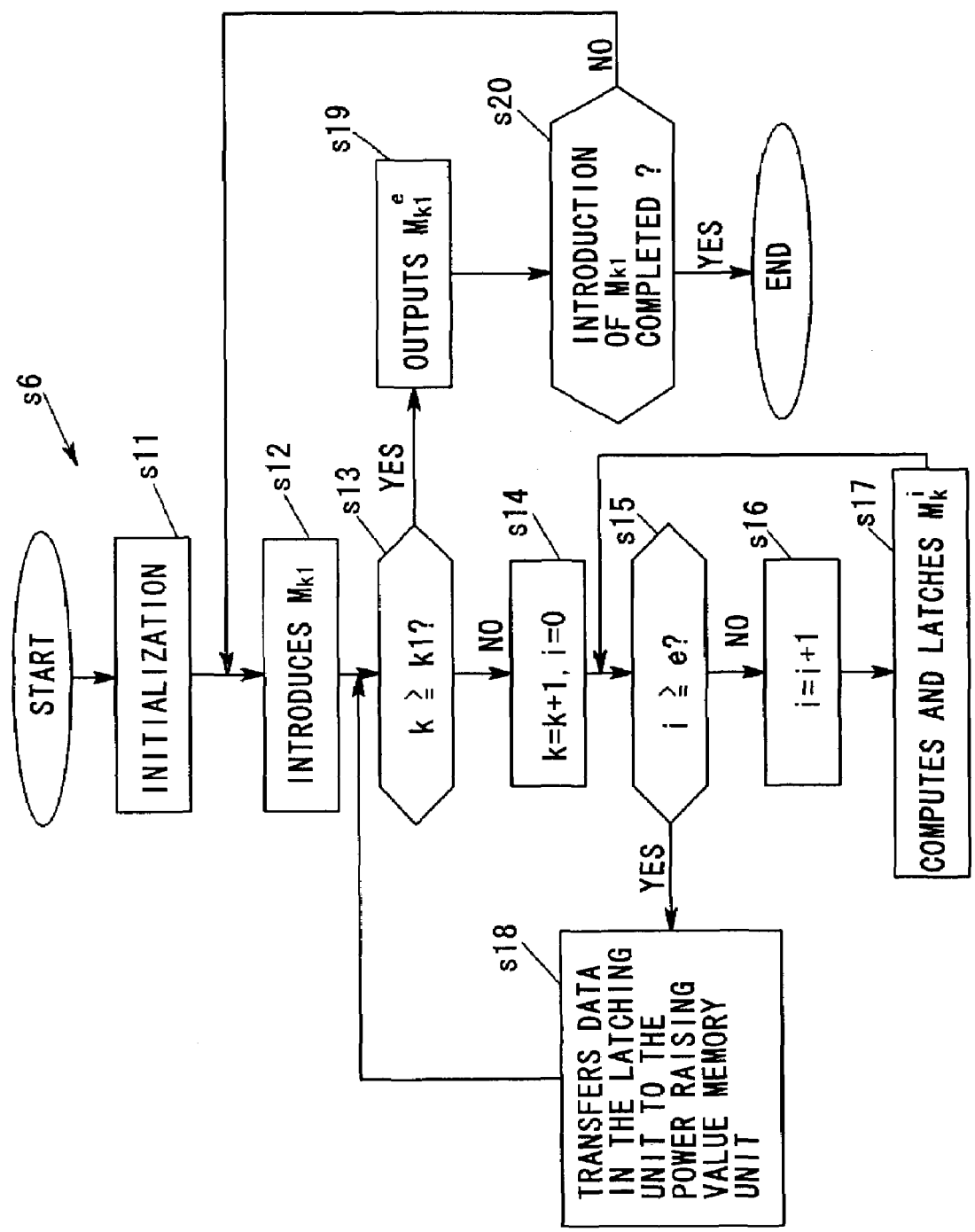
FIG. 6 is an example of flowchart for designating details of the cryptographic arithmetic operating processes shown in FIG. 5.

Next, step S6 is entered, in which the CPU 42 serially treats a predetermined number of the rearranged plain texts $M_{k1}$ with enciphering arithmetic operations. FIG. 6 presents an example of flowchart for designating details of the enciphering arithmetic operations executed during step S6.

FIG. 7 to FIG. 18 are respectively explanatory of examples of the transition of the state of the arithmetic operating units 21 while executing an enciphering arithmetic operation. Next, based on FIG. 6 to FIG. 18, taking a predetermined number of rearranged plain texts shown in FIG. 19B for example, an enciphering arithmetic operation related to the present invention is described below.

Figure 7:
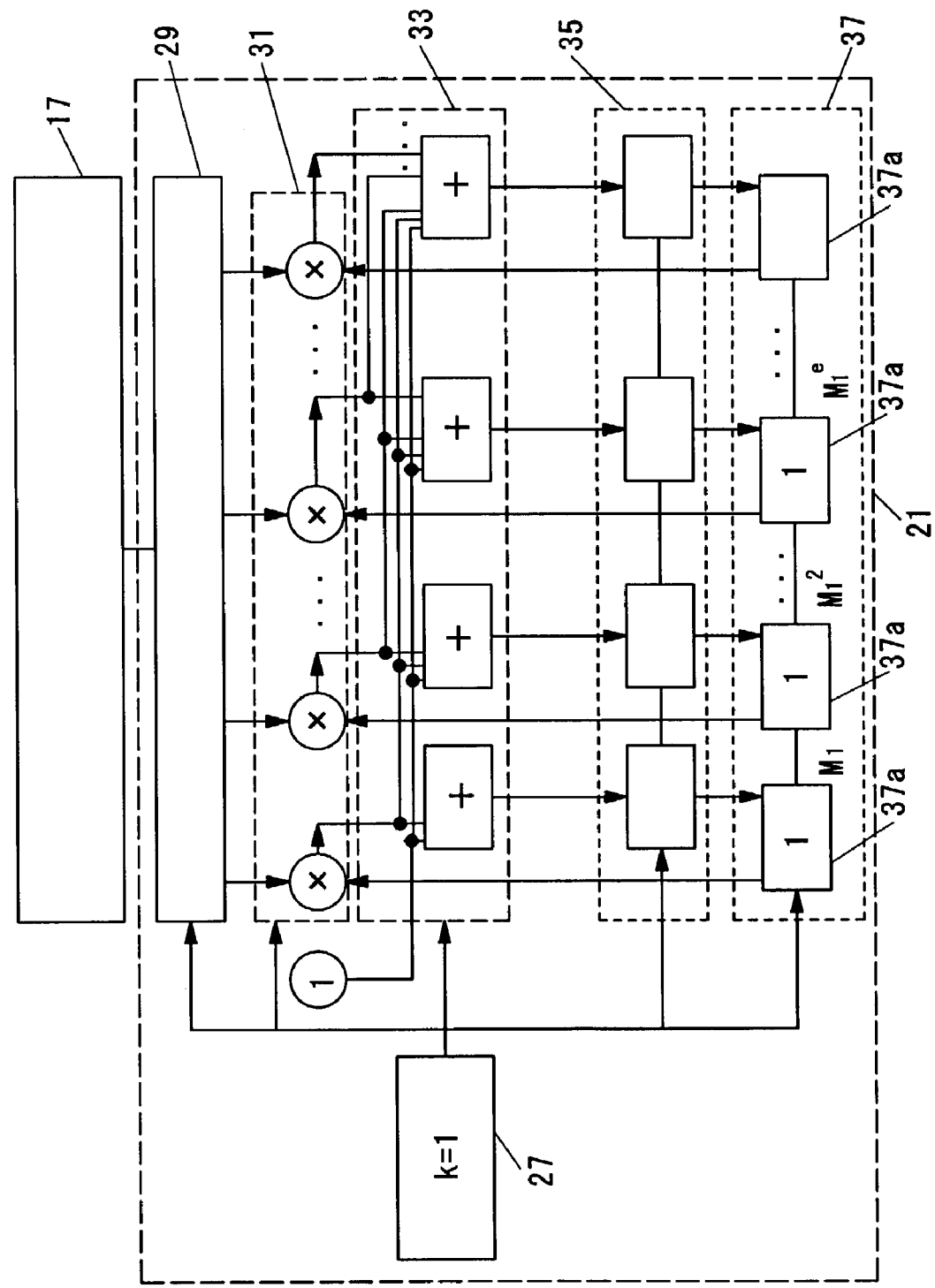
FIG. 7 is a schematic block diagram for designating an example of transition of the state of the arithmetic operating unit 21 during a cryptographic arithmetic operation.

As shown in FIG. 6, upon reception of a signal from the CPU 42 for activating an enciphering arithmetic operation, step S11 is entered, in which the controlling unit 27 of the arithmetic operating unit 21 initializes itself. As shown in FIG. 7, in the course of the initializing process, the controlling unit 27 initializes the power raising value memory unit 37 and a counter unit (not shown) for constituting the arithmetic operating unit 21.

Initialization of the power raising value memory unit 37 is executed by way of initializing e-units of the memory-use RAM 37a required for storing a group of power raising values $M_{k-1}^j$ corresponding to j=1 through e among a plurality of the memory-use RAMs 37a (i.e., b-bit RAMs) for constituting the power raising value memory unit 37.

More particularly, the above initialization is executed by causing a group of power raising values $M_{k-1}^j$ corresponding to j=1 through e in relation to k−1=k0 to be set to e-units of the memory-use RAMs 37a. Since k0=1 is present in this embodiment, a group of power raising values $M_1^j$ (=1) corresponding to j=1 through e are set to e-units of the memory-use RAMs 37a for constituting the power raising value memory unit 37.

When initializing the power raising value memory unit 37, it is also allowable to initialize the whole of the memory-use RAMs 37a for constituting the power raising value memory unit 37.

Initialization of the counter unit is executed by setting a k-counter (not shown) to k=k0. In this embodiment, k0=1 is introduced, and thus, the k-counter is set to k=1.

Figure 8:
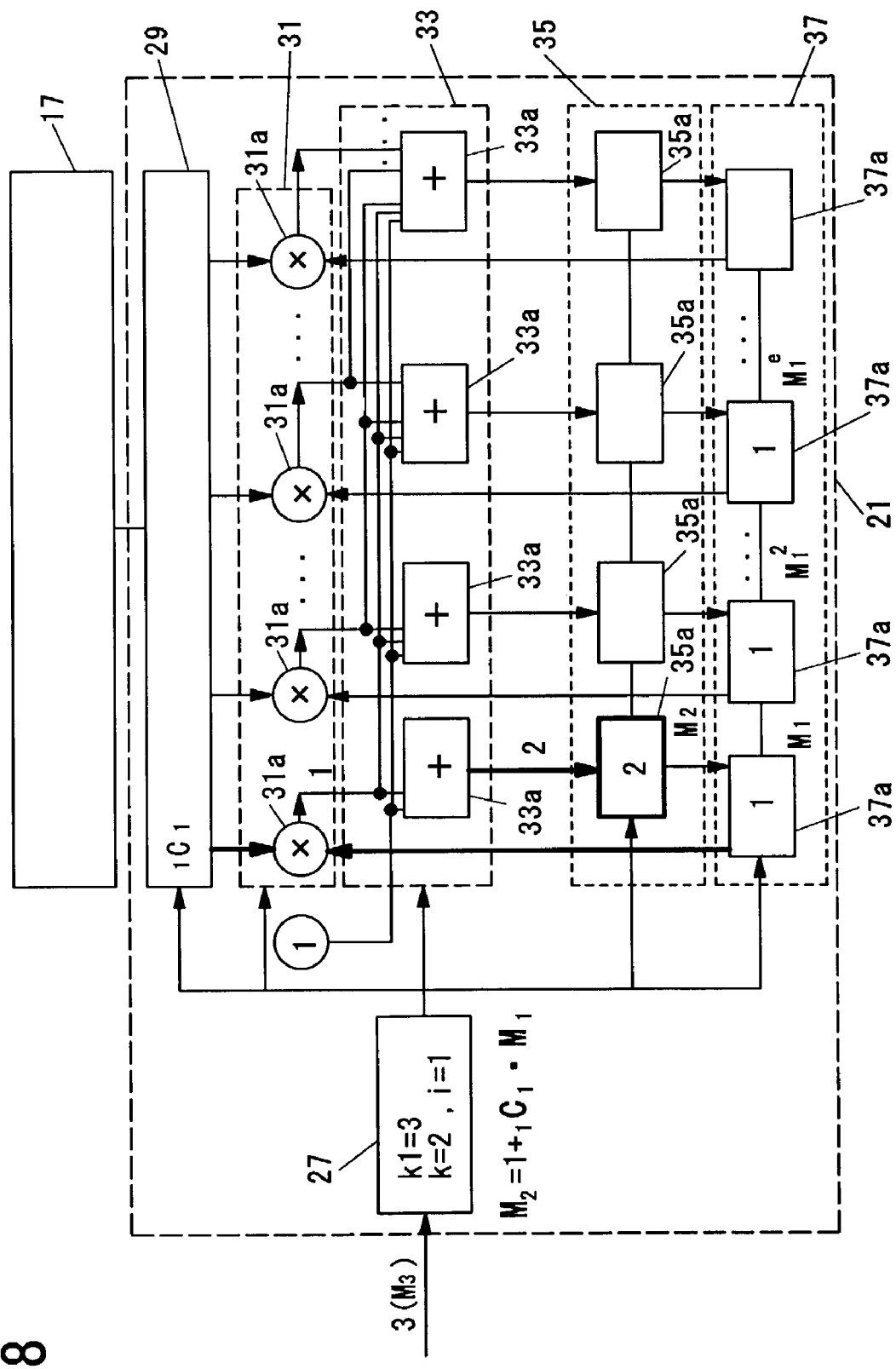
FIG. 8 is a schematic block diagram for designating an example of transition of the state of the arithmetic operating unit 21 during a cryptographic arithmetic operation.

After completing the initializing process, the controlling unit 27 receives the plain text $M_{k1}$ and then stores the value of k1 (i.e., the value of $M_{k1}$ itself) attached to the plain text $M_{k1}$. This corresponds to step S12. In this case, as shown in FIG. 8, the first plain text "3" is delivered to the controller 27, which then stores k1=3.

Next, step S13 is entered, in which the controlling unit 27 identifies whether the value k of the k-counter is equal to or exceeds k1 or not. If the value k does not coincide with k>=k1, the controlling unit 27 adjusts the value to become k=k+1, and then, step S14 is entered, in which the value of i-counter (not shown) of the counter unit is set to i=0.

Next, when step S15 is entered, the controlling unit 27 identifies whether the value i of the i-counter is equal to or exceeds "e" or not. If the value i does not coincide with i>=e, step S16 is entered, in which the controlling unit 27 adjusts the value to become i=i+1.

Next, based on an equation $M_k^i = 1 + \Sigma((j=1, i)\,_iC_j \cdot M_{k-1}^j)$, the controlling unit 27 computes a power raising value $M_k^i$ prescribed by values k and i shown by the present k-counter and the i-counter, and then latches the computed power raising value $M_k^i$ into an i-th latching-use RAM 35a of the latching unit 35. This corresponds to step S17. In FIG. 8, the above power raising value is latched into the i-th latching use RAM 35a shown from the left side.

Next, serial operations related to step S17 are described below. Among a plurality of binomial coefficients stored in the coefficient memory unit 17, the controlling unit 27 selects i-units of the first through i-th binomial coefficients $_iC_j$ corresponding to j=1 through i, and then transmits them to the first through i-th multipliers 31a (in FIG. 8, i-units of multipliers 31a ranging from the left-end to the i-th are shown) corresponding to j=1 through i among the plurality of multipliers 31a constituting the multipliers 31.

Simultaneously, among a plurality of the memory-use RAMs 37a (b-bit RAMs) for constituting the power raising value memory unit 37, the controlling unit 27 reads $M_{k-1}^1$ through $M_{k-1}^i$ stored in the first through i-th RAMs 37a (in FIG. 8, i-units of the first through i-th RAMs 37a are shown from the left side) corresponding to j=1 through i, and then transmits them to the corresponding first through i-th multipliers 31a among the multiplier components 31.

Next, based on i-units of binomial coefficients selected from the coefficient memory unit 17 and i-units of power raising values transmitted from the power raising value memory unit 37, the first through i-th multipliers 31a of the multiplier 31 respectively compute values of $_iC_1 \cdot M_{k-1}$ through $_iC_i \cdot M_{k-1}^i$ corresponding to j=1 through i based on the controlling operation of the controlling unit 27.

Next, the i-th adding unit 33a (the i-th adding unit 33a from the left side shown in FIG. 8) of the adder 33 computes a sum of i-unit of the result computed by the multiplier 31 and a numerical value "1" under the controlling operation of the controlling unit 27. As a result, a unit of power raising value $M_k^i = 1 + \Sigma((j=1, i)\,_iC_j \cdot M_{k-1}^j)$ corresponding to each one unit of k and i is acquired.

The above power raising value $M_k^i$ is latched into the i-th latching RAM 35a of the latching unit 35 under the controlling operation of the controlling unit 27.

As shown in FIG. 8, since k=2 and i=1, a power raising value $M_k^i = M_2$ is computed in accordance with an equation $M_2 = 1 + _1C_1 \cdot M_1$, and then the computed power raising value $M_2 = 2$ is latched into the first latching RAM 35a (the one shown to the left side in FIG. 8) of the latching unit 35.

Referring again to FIG. 6, the controlling unit 27 repeats serial operations within steps S15 through S17 until i=e is achieved.

Figure 9:
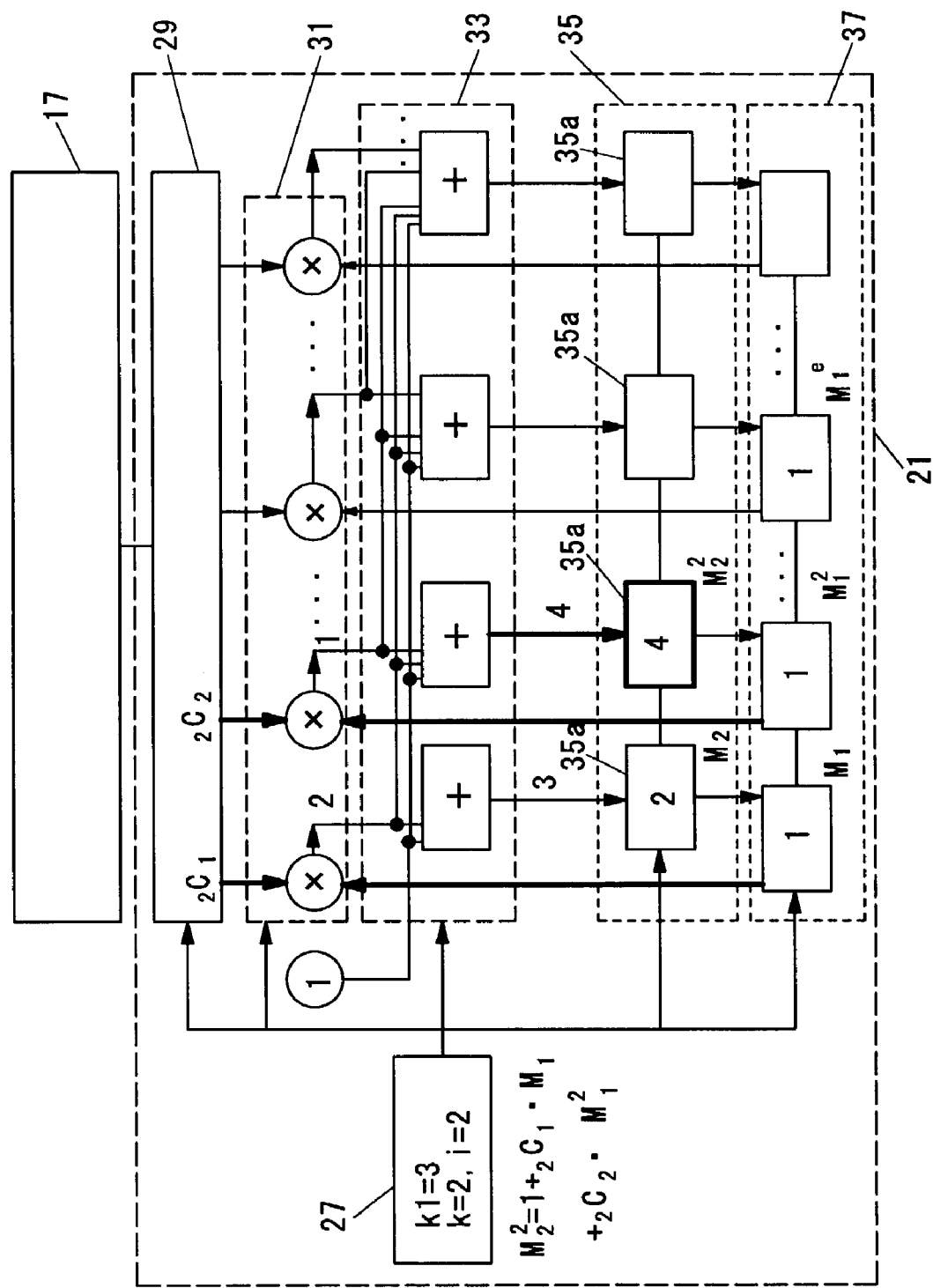
FIG. 9 is a schematic block diagram for designating an example of transition of the state of the arithmetic operating unit 21 during a cryptographic arithmetic operation.

FIG. 9 is a schematic block diagram for explanatory of the operations related to step S17 when i=2 is present. Since k=2 and i=2 are present in FIG. 9, a power raising value $M_k^i = M_2^2$ is computed in accordance with an equation $M_2^2 = 1 + _2C_1 \cdot M_1 + _2C_2 \cdot M_1^2$, and then the computed power raising value $M_2^2 = 4$ is latched into the second latching RAM 35a (the second one from the left side shown in FIG. 9) of the latching unit 35.

Figure 10:
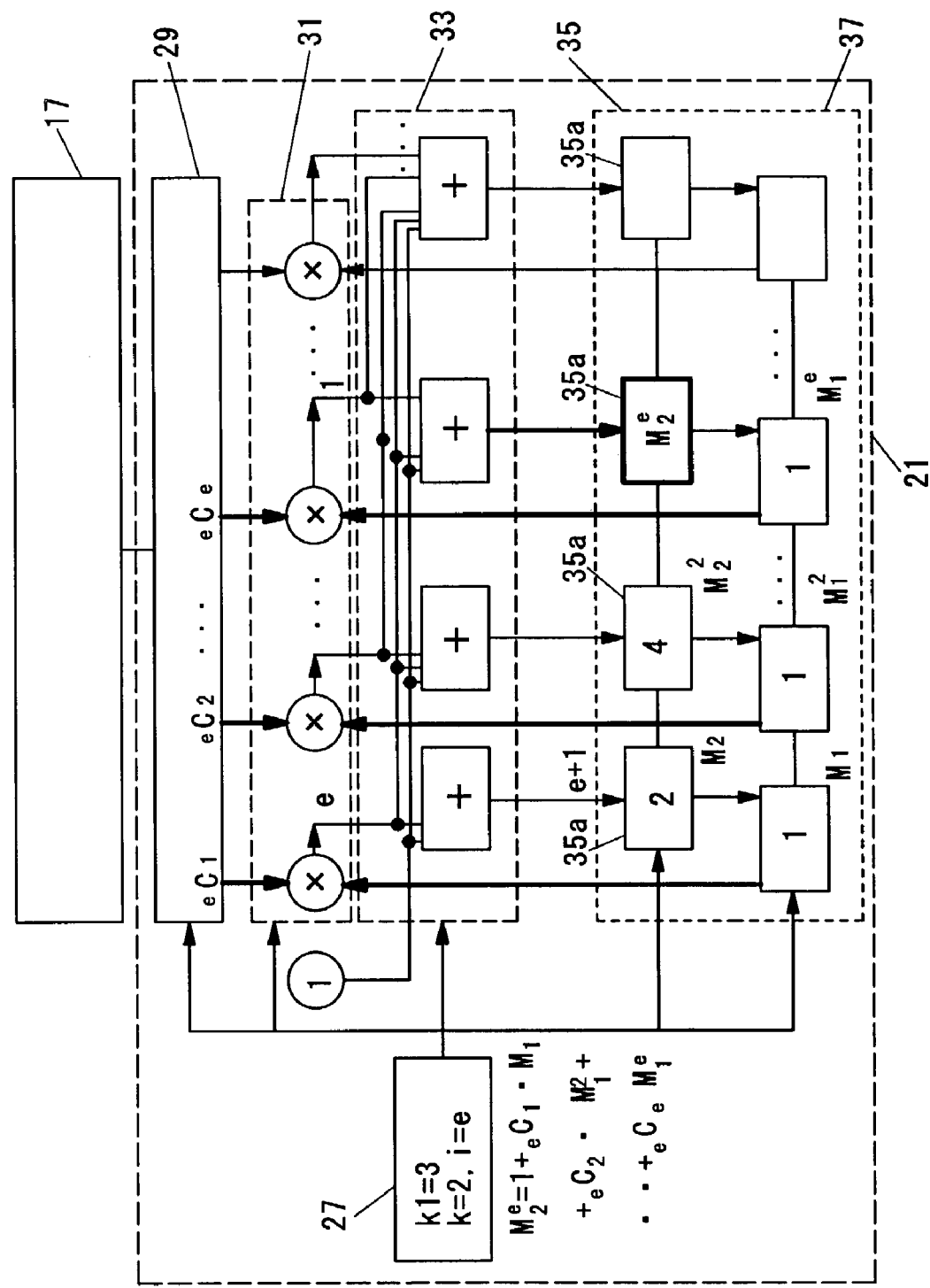
FIG. 10 is a schematic block diagram for designating an example of transition of the state of the arithmetic operating unit 21 during a cryptographic arithmetic operation.

FIG. 10 is a schematic block diagram for explanatory of the operations related to step S17 when i=e is present. Since k=2 and i=e is present in FIG. 10, a power raising value $M^{i} = M_2^e$ is computed in accordance with an equation $M_2^e = 1 + _eC_1 \cdot M_1 + _eC_2 \cdot M_1^2 + \ldots + _eC_e \cdot M_1^e$, and then the computed power raising value $M_2^e$ is latched into the e-th latching RAM 35a (the e-th latching RAM 35a from the left-side shown in FIG. 10) of the latching unit 35.

Figure 11:
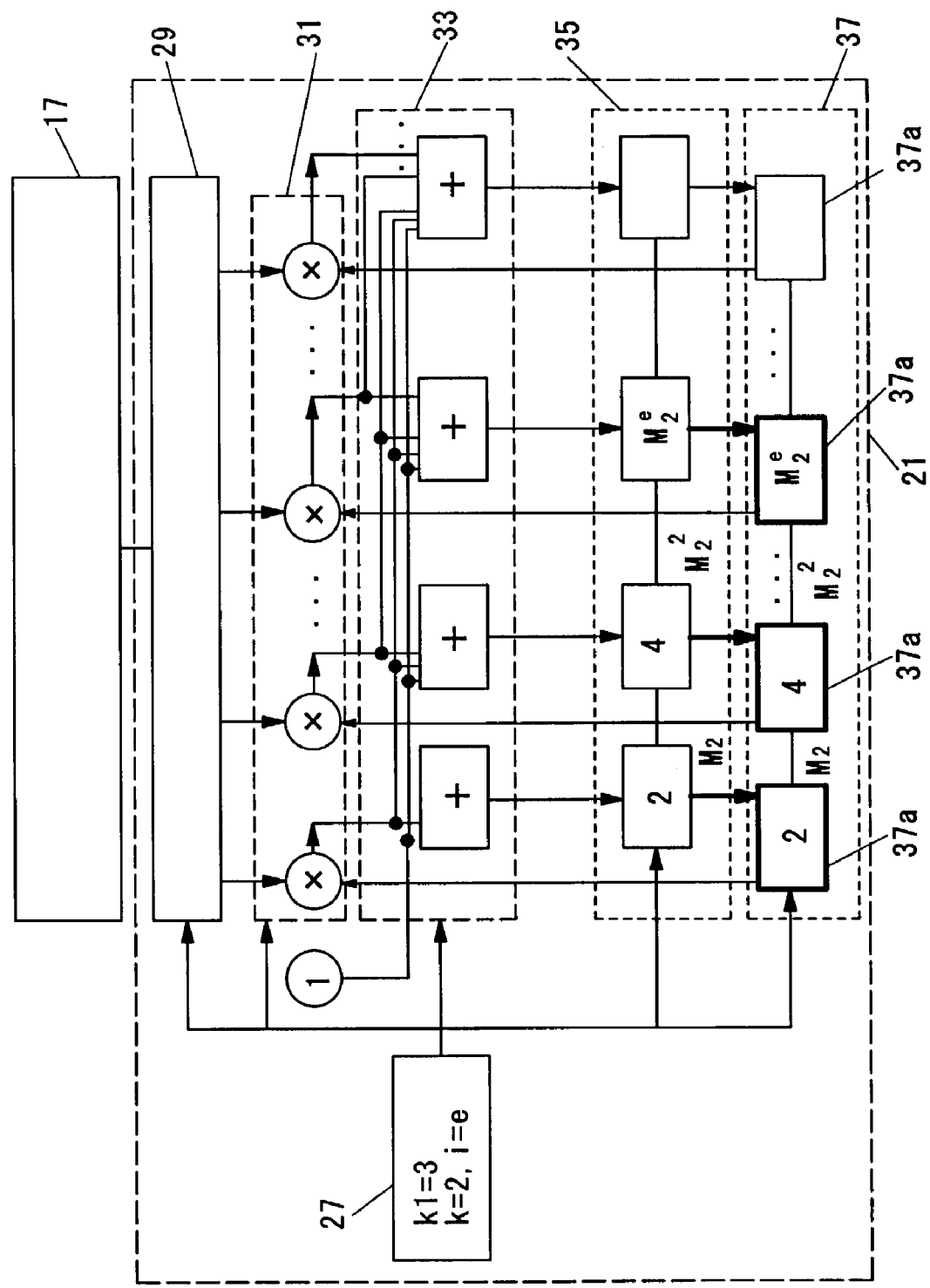
FIG. 11 is a schematic block diagram for designating an example of transition of the state of the arithmetic operating unit 21 during a cryptographic arithmetic operation.

In this way, a group (e-units) of power raising values $M_k^i$ corresponding to i=1 through e in relation to one unit of k is computed, and then these power raising values are latched into the first through e-th latching RAMs 35a of the latching unit 35. Next, as shown in FIG. 11, among a plurality of memory-use RAMs 37a for constituting the power raising value memory unit 37, the controlling unit 27 transfers the above power raising values $M_k^i$ latched by the latching unit 35 to the corresponding first through e-th memory-use RAMs 37 for storage. (Refer to FIG. 6: The above processes are executed in step S18)

As shown in FIG. 11, since k=2, e-units of power raising values $M_2^i$ corresponding to i=1 through e, concretely, $M_2=2, M_2^2=4, \ldots M_2^e$ are respectively stored in the power raising value memory unit 37.

As shown in FIG. 6, the controlling unit 27 repeats operations within steps S13 through S18 until k=k1 is achieved.

Figure 12:
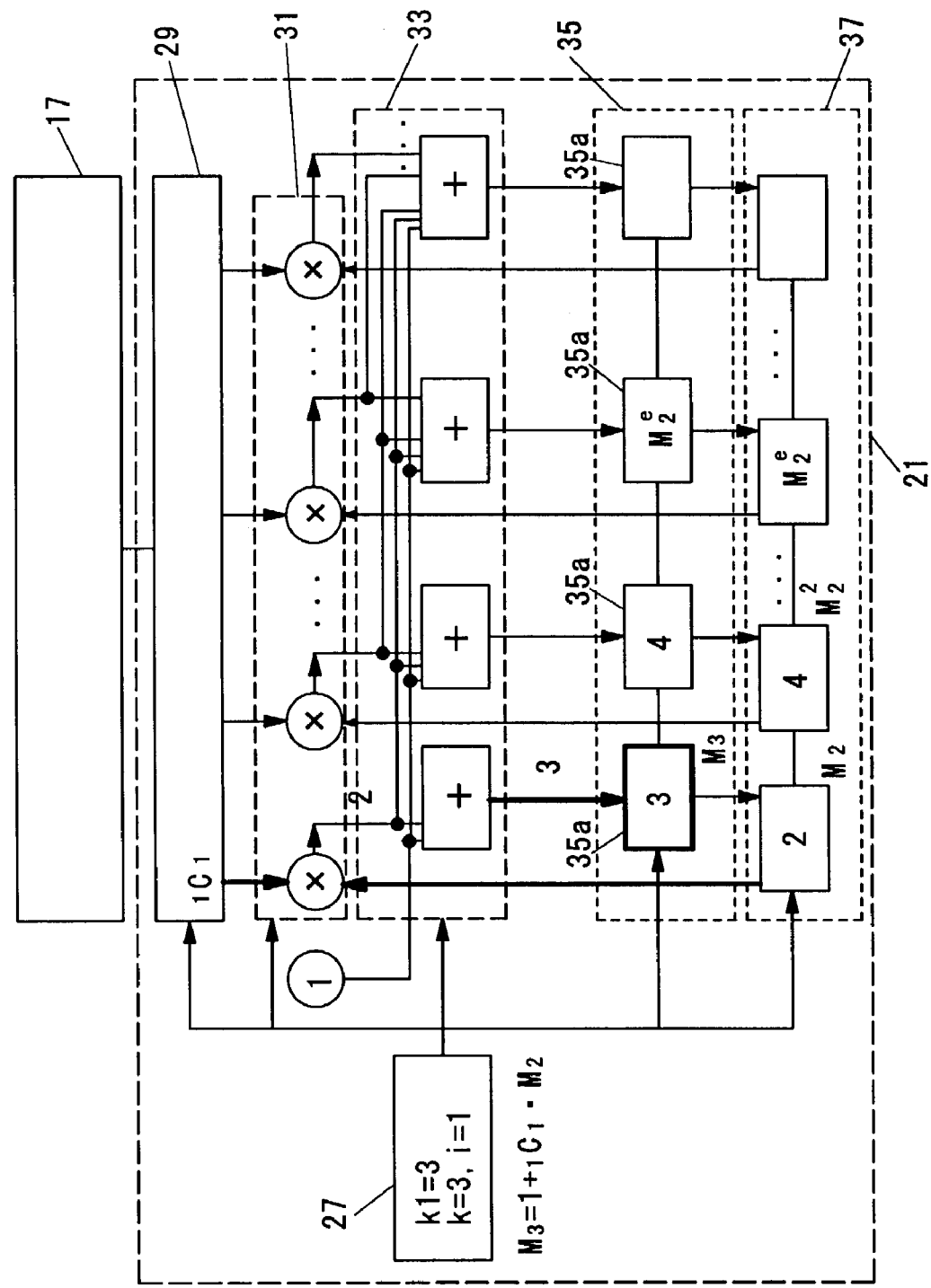
FIG. 12 is a schematic block diagram for designating an example of transition of the state of the arithmetic operating unit 21 during a cryptographic arithmetic operation.

FIG. 12 is a schematic block diagram for explanatory of the operations related to step S17 when k=3 and i=1 are present. Since k=3 and i=1, based on a power raising value $M_2$ among a group (e-units) of power raising values stored in the power raising value memory unit 37, a power raising value $M_k^i=M_3$ is computed in accordance with an equation $M_3=1+{}_1C_1 \cdot M_2$, and then the computed power raising value $M_3=3$ is latched into the first latching RAM 35a of the latching unit 35.

Figure 13:
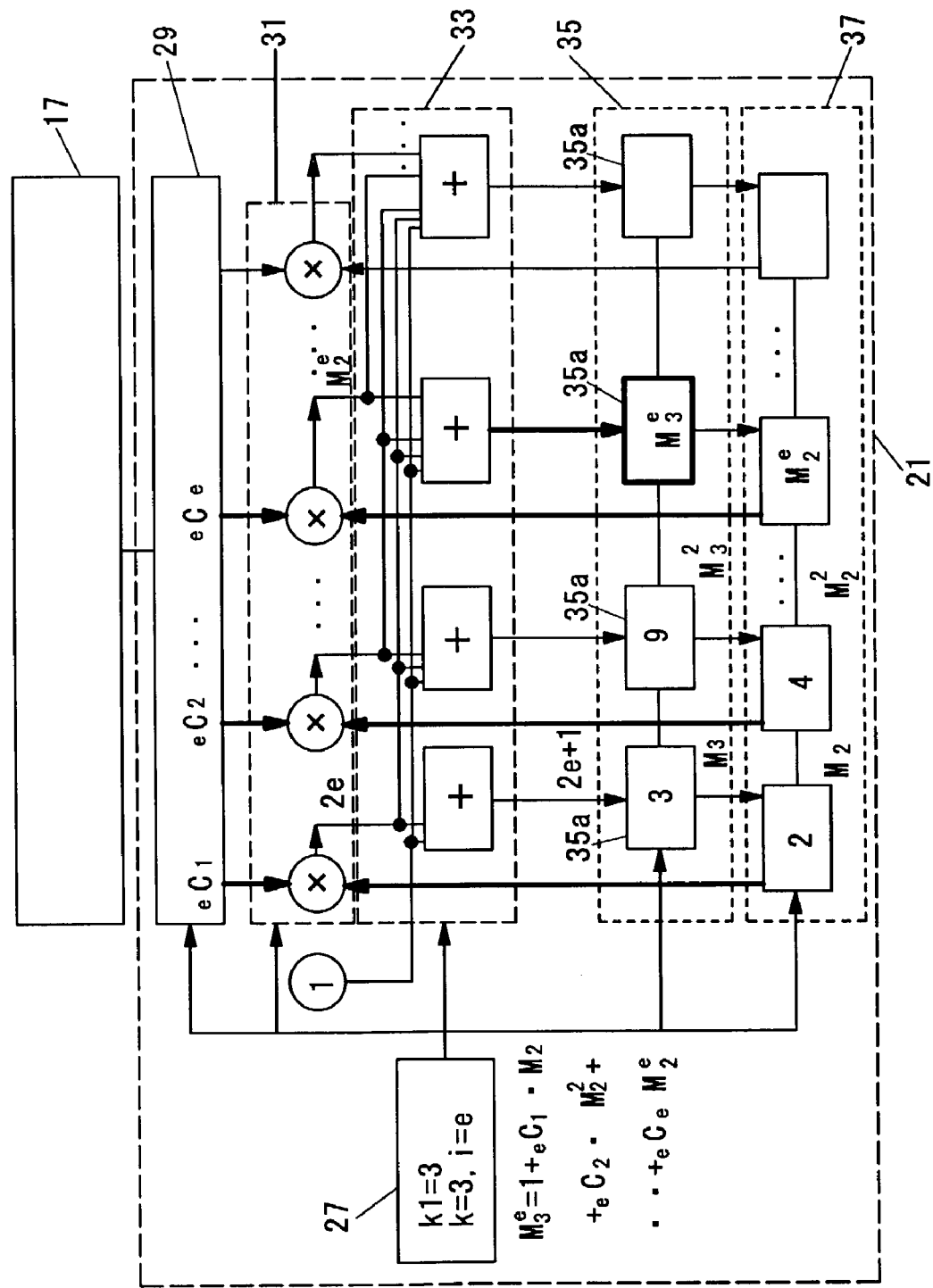
FIG. 13 is a schematic block diagram for designating an example of transition of the state of the arithmetic operating unit 21 during a cryptographic arithmetic operation.

FIG. 13 is a schematic block diagram for explanatory of the operations related to step S17 when k=3 and i=e are present. Since k=3 and i=e, based on a group (e-units) of power raising values $M_2, M_2^2, \ldots, M_2^e$, stored in the power raising value memory unit 37, a power raising value $M^i=M_3^e$ is computed in accordance with an equation $M_3^e=1+{}_eC_1 \cdot M_2+{}_eC_2 \cdot M_2^2+\ldots+{}_eC_e \cdot M_2^e$, and then the computed power raising value $M_3^e$ is latched into the e-th latching RAM 35a of the latching unit 35.

Figure 14:
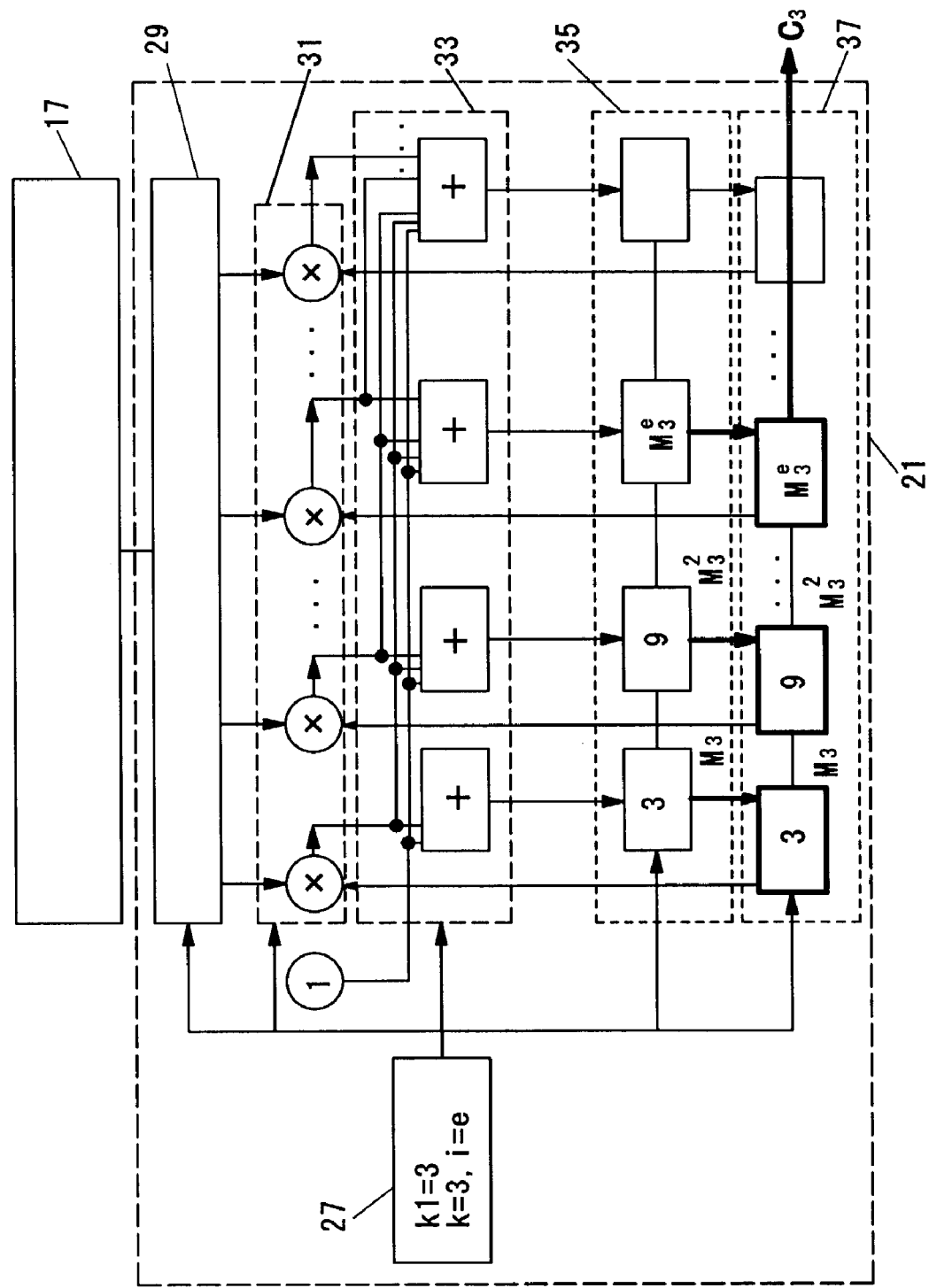
FIG. 14 is a schematic block diagram for designating an example of transition of the state of the arithmetic operating unit 21 during a cryptographic arithmetic operation.

Like the case of k=2, in relation to k=3, a group (e-units) of power raising values $M_k^i$ corresponding to i=1 through e are computed, which are then latched into the first through e-th latching RAMs 35a of the latching unit 35. Then, as shown in FIG. 14, among a plurality of memory-use RAMS 37a for constituting the power raising value memory unit 37, the controlling unit 27 transfers the above power raising values $M_k^i$ latched by the latching unit 35 to the corresponding first through e-th memory-use RAMs 37a for storage therein. The above processes correspond to step S18.

As shown in FIG. 6, while step S13 is underway, if it is identified that k=k1 (=3) is present, then, as shown in FIG. 14, step S19 is entered, in which the controlling unit 27 outputs a power raising value $M_k^e=M_{k1}^e$ stored in the e-th memory-use RAM 37a of the power raising value memory unit 37 as a cipher text $C_{k1}$. Since k1=3 is achieved, a cipher text $C_{k1}=C_3$ is externally output.

As shown in FIG. 6, when step S20 is entered, the controlling unit 27 identifies whether internal storage of one or two or more than two units of plain texts $M_{k1}$ rearranged in the past step S5 (refer to FIG. 5) has fully been completed or not.

If it is identified that there are still remaining plain texts $M_{k1}$ subject to internal storage, the controlling unit 27 repeats processing operations corresponding to steps S12 through S20 so as to treat all the remaining plain texts $M_{k1}$.

Figure 15:
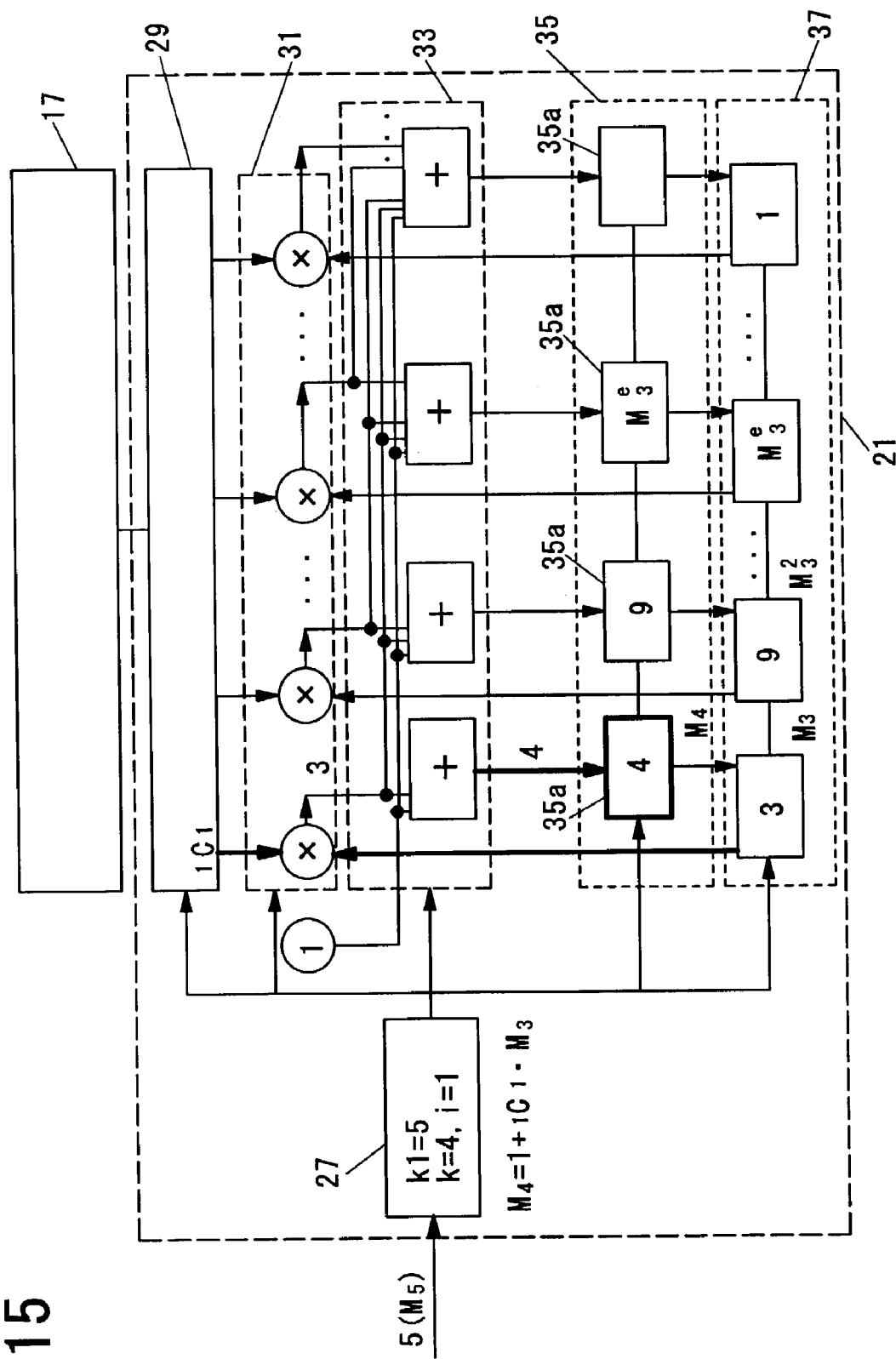
FIG. 15 is a schematic block diagram for designating an example of transition of the state of the arithmetic operating unit 21 during a cryptographic arithmetic operation.

FIG. 15 is a schematic block diagram for explanatory of the operations related to step S17 when k1=5, k=4, and i=1, are present. Since k=4 and i=1, based on a power raising value $M_3$ among a group (e-units) of power raising values stored in the power raising value memory unit 37, a power raising value $M_k^i=M_4$ is computed in accordance with an equation $M_4=1+{}_1C_1 \cdot M_3$, and then the computed power raising value $M_4=4$ is latched into the first latching RAM 35a of the latching unit 35.

Figure 16:
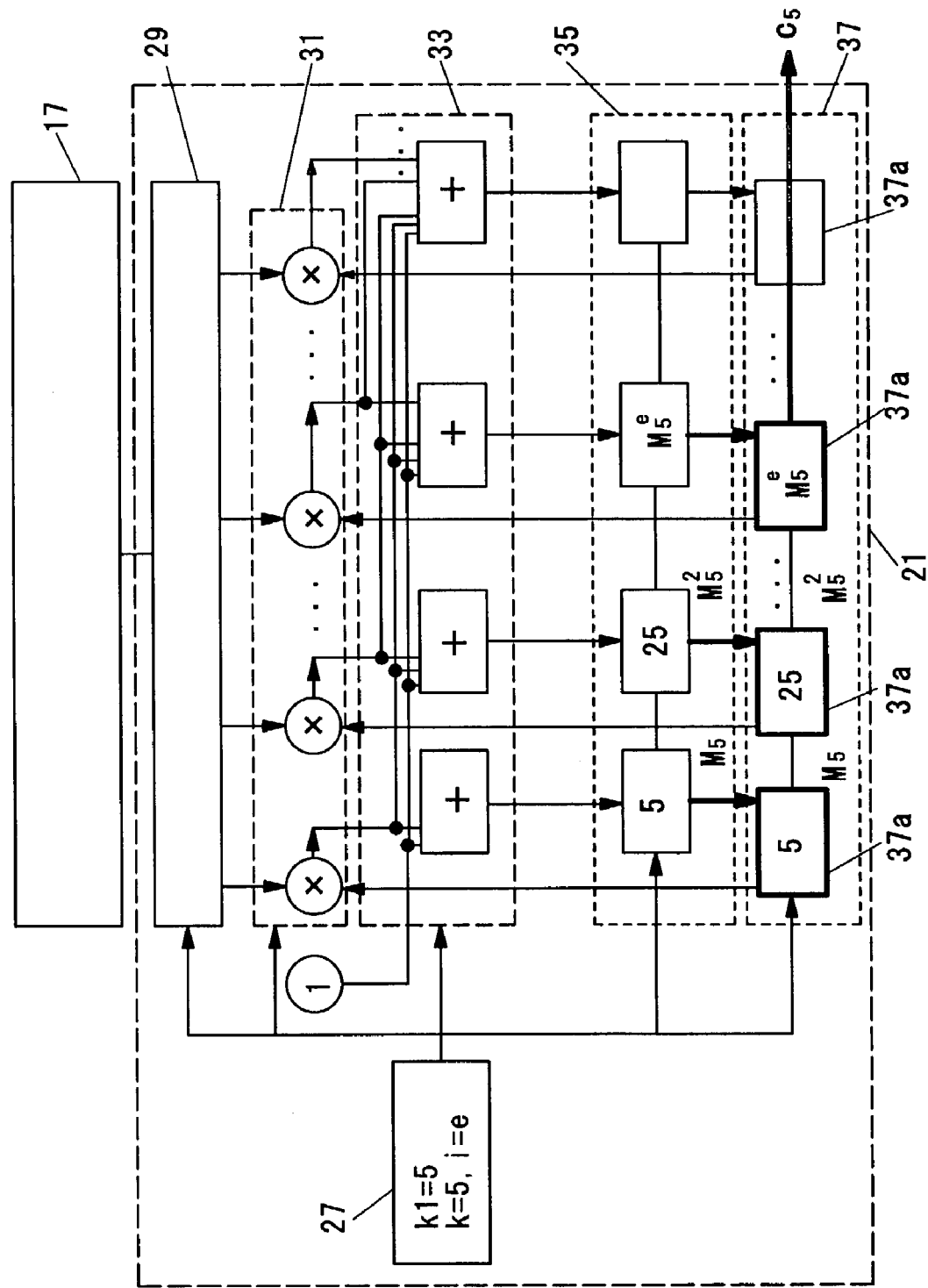
FIG. 16 is a schematic block diagram for designating an example of transition of the state of the arithmetic operating unit 21 during a cryptographic arithmetic operation.

FIG. 16 is a schematic block diagram for explanatory of the operations related to step S19 when k1=5 is present. Like the case of k1=3, the controlling unit 27 outputs a power raising value $M_k^e=M_{k1}^e$ stored in the e-th memory-use RAM 37a of the power raising value memory unit 37 as a cipher text $C_{k1}$. In this case, since k1=5, a cipher text $C_{k1}=C_5$ is eventually output.

Figure 17:
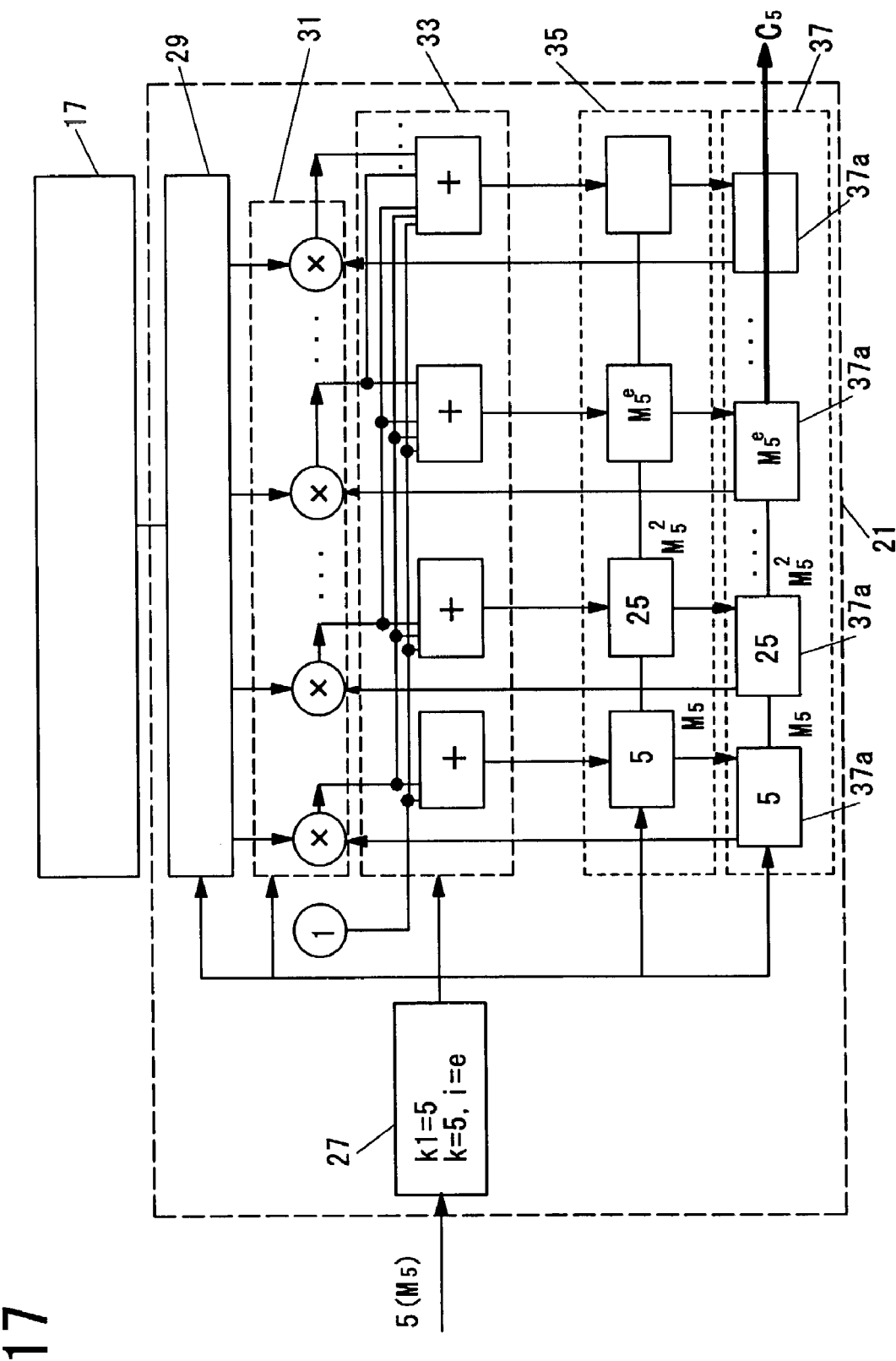
FIG. 17 is a schematic block diagram for designating an example of transition of the state of the arithmetic operating unit 21 during a cryptographic arithmetic operation.

FIG. 17 is a schematic block diagram for explanatory of processes when a plurality of plain texts $M_{k1}$ each bearing identical values are serially introduced. Since a newly stored plain text $M_{k1}$ during a period of step S12 is exactly identical to the plain text $M_{k1}$ complete with an immediately preceding enciphering process, a value k1=k is present. Accordingly, after completing an identifying process during the past step S13, an ensuing step S19 is entered, in which the controlling unit 27 externally outputs the above power raising value $M_k^e=M_{k1}^e$ stored in the e-th memory-use RAM 37a of the power raising value memory unit 37 as a cipher text $C_{k1}$ as it is.

In this case, since the newly stored plain text corresponds to $M_{k1}=5$, the controlling unit 27 is enabled to output a cipher text $C_{k1}=C_5$.

Figure 18:
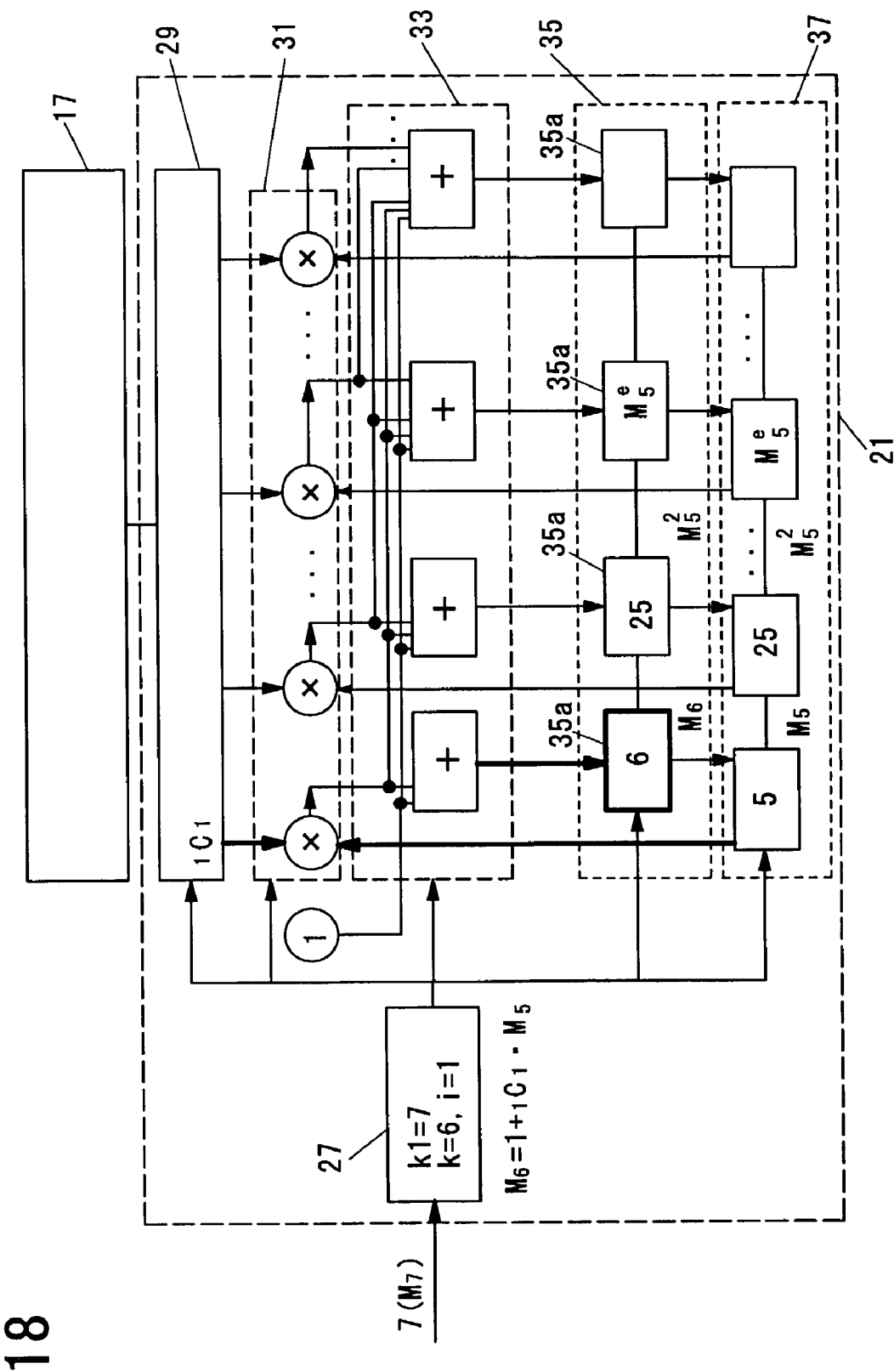
FIG. 18 is a schematic block diagram for designating an example of transition of the state of the arithmetic operating unit 21 during a cryptographic arithmetic operation.

FIG. 18 is a schematic block diagram for explanatory of the operations related to step S17 when k1=7, k=6, and i=1, are present. Since k=6 and i=1 are present, based on a power raising value $M_5$ among a group (e-units) of power raising values stored in the power raising value memory unit 37, a power raising value $M_k^i=M_6$ is computed in accordance with an equation $M_6=1+{}_1C_1 \cdot M_5$, and then the computed power raising value $M_6=6$ is latched into the first latching RAM 35a of the latching unit 35.

As described above, by way of executing enciphering arithmetic operations after properly rearranging a plurality of plain texts $M_{k1}$, whenever executing an enciphering arithmetic operation against a new plain text $M_{k1}$, it is possible to serially utilize the results and the course of the enciphering arithmetic operation previously executed against the plain text $M_{k1}$, and thus, an overall time required for implementing the enciphering arithmetic operations can securely be contracted.

Based on the above processes, after completing overall enciphering arithmetic operations against one or two or more of plain texts previously rearranged via step 5 (refer to FIG. 5), step S20 is entered, in which the controlling unit 27 completes operating processes related to step S6 (refer to FIG. 5), and then returns the controlling command to the CPU 42. Step S6 corresponds to the arithmetic operating step.

Refer again to FIG. 5. When step S7 is entered, the CPU 42 rearranges the cipher texts $C_{k1}$ output during step S6. As shown in FIG. 20A, each of the cipher texts $C_{k1}$ output in the course of step S6 is stored in the main memory 52 based on the output sequence while preserving the relationship with the above-referred input numbers. In this embodiment, memory area of plain texts shown in FIG. 19B is overwriten by means of the corresponding cipher text as shown in FIG. 20A.

When step S7 is entered, the CPU 42 rearranges a plurality of cipher texts shown in FIG. 20A according to the sequence of the corresponding input numbers. In FIG. 20B are shown the plurality of cipher texts rearranged according to the sequence of the input numbers. This step S7 corresponds to the output arranging step.

Next, step S4 is entered, in which the CPU 42 identifies whether there are still unprocessed plain texts subject to rearrangement or not. If it is identified so, the CPU 42 repeats operating processes within steps S4 through S7.

If it is identified that there is no more plain text subject to rearrangement, step S8 is entered, in which the CPU 42 externally outputs the cipher texts shown FIG. 20B stored in the main memory 52. Output format is not specifically restricted. It is allowable to designate the cipher texts shown in FIG. 20B based on the sequence of the input number. For example, it is allowable to display them on the CRT 44 or transfer them to the hard disc 50, or print them out against papers via a printer (not shown), or externally output them via a communication network (not shown).

Note that, the operating steps S1 through S2 and step S4 shown in FIG. 5 respectively correspond to the input terminal 13 (input step) shown in FIG. 1. Step S3 corresponds to the coefficient acquiring unit 15 and the coefficient memory unit 17. Step S5 corresponds to the input arranging unit 19. Step S6 corresponds to the arithmetic operating unit 21. Step S7 corresponds to the output arranging unit 23. Step 8 corresponds to the output terminal 25 (output step).

The operating step S11 through S16 and steps S19 and S20 shown in FIG. 6 respectively correspond to the controlling unit 27 shown in FIG. 1. Step S17 corresponds to the coefficient selector 29, the multiplier 31, the adder 33, and the latching unit 35. Step S18 corresponds to the power raising value memory unit 37.

In the above embodiment, it is arranged to execute arithmetic operations for enciphering and deciphering processes by applying a group of power raising values $X_{k0}{}^j$ as the initial value when k0=1 is present. However, the scope of the present invention is not solely limited to the above embodiment, but it is also allowable to execute arithmetic operations for enciphering and deciphering processes by applying a group of power raising values $X_{k0}{}^j$ as the initial value when k0=0 is present for example.

Further, in the above embodiment, it is so arranged that, when computing a group of power raising values $X_k{}^i$ corresponding to i=1 through m in relation to one unit of k, computation is serially repeated by applying one unit of power raising value $X_k{}^i$ corresponding to each unit of k and i as a unit. However, the scope of the present invention is also not solely limited to this embodiment.

For example, it is also possible to simultaneously compute a group of power raising values $X_k{}^i$ corresponding to i=1 through m in relation to one unit of k. However, by way of introducing the constitution in the above case, the number of multipliers can be decreased, and thus, it is possible to decrease the number of logic gates required for the system as well.

Further, in the above embodiment, it is so arranged that the power raising value memory unit 37 stores a group of power raising values $X_{k-1}{}^j$ corresponding to j=1 through m in relation to one unit of k. However, the actual form of the power raising value memory unit 37 is not solely limited to the above.

For example, it is also possible to constitute the power raising value memory unit 37 so as to store a group of power raising values $X_{k-1}{}^j$ corresponding to j=1 through m in relation to two or more of k as well. However, by way of forming the power raising memory unit 37 as described above, it is possible to decrease the number of memory elements required for operating the system.

Further, in the above embodiment, it is so arranged that the above coefficient acquiring unit 15 acquires the required binomial coefficients corresponding to integers n and m via computations and then enables the coefficient memory unit 17 to store them therein. However, the scope of the present invention is not solely limited to this method. For example, it is also allowable to previously store a number of binomial coefficients in memory areas provided inside or outside of the enciphering and deciphering apparatus so as to enable these memory areas to transfer the required binomial coefficients to the coefficient memory unit 17.

Further, in the above embodiment, the above description has exemplified the case of using a ferroelectric capacitor CF functioning itself as a memory element for constituting a memory cell of the coefficient memory unit 17. However, the scope of the memory element for constituting a memory cell is not solely limited to the ferroelectric capacitor CF alone. As the memory element for constituting a memory cell, it is also possible to use other ferroelectric memory elements such as a ferroelectric transistor or the like.

Further, as the memory element for constituting a memory cell, it is also possible to use a non-volatile memory element other than the ferroelectric memory element such as an $E^2PROM$ (electrically erasable programmable read-only memory) for example. In addition, as the memory element for constituting a memory cell, it is also possible to use a volatile memory element such as a cross-coupled flip flop or the like for example.

However, when introducing a ferroelectric memory element as the memory element for constituting a memory cell, it dispenses with the provision of a back-up battery and a special data-writing unit, and yet, enables data reading and writing operations at a high speed, thus providing practical advantages.

Further, in the above embodiment, it is so arranged that the coefficient memory unit 17 stores essentially the whole of binomial coefficients $_iC_j(1<=i<=e, 1<=j<=i)$. However, the scope of the present invention is not solely limited to this method, but it is also possible to arrange that the coefficient memory unit 17 stores the whole or part of the binomial coefficients $_iC_j(1<=i<=e, 0<=j<=i)$ for example.

More particularly, it is also possible to have the coefficient memory unit 17 store another binomial coefficient $_iC_0$ $(1<=i<=e)$ for example. In this case, based on an equation $X_k{}^i=\Sigma((j=0, i)_iC_j \cdot X_{k-1}{}^j)$, it is possible to have the arithmetic operating unit 21 compute a group of power raising values $X_k{}^i$.

On the other hand, it is also possible to have the coefficient memory unit 17 store essentially part of a binomial coefficient $_iC_j(1<=i<=e, 1<=j<=i)$. In this case, it is suggested that any binomial coefficient which is not stored in the coefficient memory unit 17 but required for the arithmetic operating unit 21 shall be acquired via arithmetic operations to be performed whenever necessary.

Further, in the above embodiment, the description has exemplified such a case in which the enciphering and deciphering apparatus is provided with all functions of the input terminal 13, the coefficient acquiring unit 15, the input arranging unit 19, the output arranging unit 23, and the output terminal 25. However, the scope of the present invention is not solely limited to the above case, but for example, it is also possible to arrange that the enciphering and deciphering apparatus is dispensed with provision of the whole or part of the functions thereof. In this case, it is possible to provide external devices with the whole or part of the functions of those components described above.

Further, in the above embodiment, the description has exemplified such a case in which the enciphering and deciphering apparatus executes an enciphering operation based on the RSA cryptographic system. However, the scope of the present invention is not solely limited to this case, but, even when the enciphering and deciphering apparatus executes a deciphering operation, the present invention is also applicable thereto. In this case, a cipher text C, a plain text M, and an integer "d" for constituting a secret key (n, d) in the RSA cryptographic system corresponds to the first expression X, the second expression Y, and an integer m described above.

Further, in the above embodiment, the description has exemplified such a case in which the enciphering and deciphering apparatus is used for enciphering and deciphering the RSA ciphers. However, the scope of the present invention is not solely limited to this case, but the present invention is also applicable to the processes for enciphering and deciphering any of those ciphers other than that of the RSA cryptographic system.

In a mathematic system in which modulo n of the positive integer is present, when a first expression consists of an optional positive integer $X_k = X_{k1}$ that satisfies an equation $X_k = X_{k-1} + 1 (1 <= k <= n-1, X_0 = 0)$, based on the first expression $X_{k1}$, the enciphering and deciphering apparatus according to the present invention seeks a second expression $Y_{k1}$ defined by an equation $Y_{k1} = X_{k1}^m$ (where m is a positive integer). The enciphering and deciphering apparatus comprises the following:

a coefficient memory unit which stores essentially the whole of a binomial coefficient $_iC_j (1 <= i <= m, 1 <= j <= i)$; and an arithmetic operating unit which, essentially based on an equation $X_k^i = 1 + \Sigma((j=1, i)_iC_j \cdot X_{k-1}^j)$, seeks a second expression $Y_{k1}$ by serially computing a group of power raising values $X_k^i$ corresponding to i=1 through m in relation to one unit of k in the above equation in a range from k=k0+1 up to k=k1 by applying a binomial coefficient stored in the coefficient memory unit based on an initial value consisting of a group of power raising values $X_{k0}^j$ corresponding to j=1 through m in relation to k−1=k0.

Further, in a mathematic system in which modulo n of the positive integer is present, when a first expression consists of an optional positive integer $X_k = X_{k1}$ that satisfies an equation $X_k = X_{k-1} + 1 (1 <= k <= n-1, X_0 = 0)$, based on the first expression $X_{k1}$, using the memory unit and the arithmetic operating unit, the enciphering and deciphering method according to the present invention seeks a second expression $Y_{k1}$ defined by an equation $Y_{k1} = Y_{k1}^m$ (where m is a positive integer). The enciphering and deciphering method according to the present invention comprises the following:

a coefficient storing step for causing a memory unit to store the whole or part of a binomial coefficient $_iC_j$ $(1 <= i <= m, 0 <= j <= i)$; and an arithmetic operating step for seeking a second expression $Y_{k1}$ by causing an arithmetic operating unit to serially compute a group of power raising value $X_k^i$ corresponding to i=1 through m in relation to one unit of k in a range from k=k0+1 up to k=k1 by applying a given constant including a group of power raising value $X_{k0}^j$ corresponding to j=1 through m in relation to k−1=k0 and the binomial coefficient stored in the above-referred memory unit essentially based on an equation $X_k^i = \Sigma((j=0, i)_iC_j \cdot X_{k-1}^j)$.

Accordingly, in the above enciphering and deciphering apparatus or the enciphering and deciphering method, it is arranged to previously store an initial value consisting of a group of power raising values $X_{k0}^j$ corresponding to j=1 through m in relation to k−1=k0 and also store a predetermined binomial coefficient in the coefficient memory unit. Using the above numerical values, the enciphering and deciphering apparatus or the enciphering and deciphering method can seek a second expression $Y_{k1}$ by serially computing a group of power raising values $X_k^i$ corresponding to i=1 through m in relation to one unit of k in a range from k=k0+1 up to k=k1.

By virtue of the above arrangement, compared to the case of previously converting the whole of the first expressions into the second expressions and storing them in memory, the number of the required memory elements can be minimized. Further, compared to the case of constituting the enciphering and deciphering apparatus solely by means of hardware, the number of the logic gates can also be decreased. Further, once the binomial coefficients corresponding to the specific integers n and m are stored in memory, thenceforth, it is possible to contract the time required for enciphering or deciphering a text pertaining to the same integers n and m.

In other words, it is possible for the present invention to realize a novel enciphering and deciphering apparatus and the enciphering and deciphering method respectively capable of contracting the time required for enciphering and deciphering processes and dispensing with provision of a huge number of memory elements and logic gates.

In the enciphering and deciphering apparatus according to the present invention, characteristically, the arithmetic operating unit incorporates the power raising value memory unit for storing a group of power raising values $X_{k-1}^j$ corresponding to j=1 through m in relation to one unit of k. Using a binomial coefficient stored in the coefficient memory unit and a group of power raising values $X_{k-1}^j$ stored in the power raising value memory unit, essentially based on an equation $X_k^i = 1 + \Sigma((j=1, i)_iC_j \cdot X_{k-1}^j)$, the arithmetic operating unit computes a group of power raising values $X_k^i$ corresponding to i=1 through m in relation to one unit of k, and then renews the contents stored in the power raising value memory unit into a group of the newly computed power raising values $X_k^i$.

Accordingly, based on the provision of the power raising value memory unit capable of storing a group of power raising values $X_k^i$ corresponding to i=1 through m in relation to one unit of k, by serially rewriting the contents of the power raising value memory unit, the arithmetic operating unit is enabled to serially compute a group of power raising values $X_k^i$ in a range from k=k0+1 up to k=k1. By virtue of this arrangement, it is possible to minimize the number of memory elements for storing the power raising values $X_k^i$ required for computing the second expression $Y_{k1}$.

In the enciphering and deciphering apparatus according to the present invention, the arithmetic operating unit characteristically comprises the following: the coefficient selector for selecting one or two or more than two of binomial coefficients required for computing a power raising value $X^{ki}$ corresponding to each one unit of k and i among those binomial coefficients stored in the coefficient memory unit; a multiplier for seeking a product of the binomial coefficient selected by the coefficient selector and one or two or more than two of power raising values $X_{k-1}^j$ corresponding to the selected binomial coefficient among a group of power raising values $X_{k-1}^j$ stored in the power raising value memory unit; an adder for seeking a sum of one or two or more than two of the products acquired by the multiplier and a numerical value "1"; the latching unit for latching the sum acquired by the adder as a power raising value $X_k^i$ corresponding to each one unit of k and i; and the controlling unit which, by way of controlling operations of the coefficient selector, the multiplier, the adder, the latching unit, and the power raising value memory unit, serially computes a plurality of power raising values $X_k^i$ corresponding to i=1 through m in relation to one unit of k, and then enables the latching unit to serially latch the computed power raising values $X_k^i$, and then, after fully latching a group of power raising values $X_k^i$ corresponding to i=1 through m in relation to one unit of k, transfers a group of the latched power raising values $X_k^i$ to the power raising value memory unit for storage therein; wherein the controlling unit further renews the contents of the power raising value memory unit into a group of the newly computed power raising values $X_k^i$, and then, by way of serially computing based on the renewed power raising values $X_k^i$ as the updated power raising values $X_{k-1}^j$, the controlling unit eventually acquires a second expression $Y_{k1}$.

Concretely, whenever computing a group of power raising values $X_k^i$ corresponding to i=1 through m in relation to one unit of k, it is arranged to repeat serial computations based on a unit of power raising value $X_k^i$ corresponding to each one unit of k and i. Because of this, compared to the case of simultaneously computing a group of power raising values $X_k^i$ corresponding to i=1 through m in relation to one unit of k, it is possible to minimize the number of the required multipliers. Accordingly, it is also possible to minimize the number of the logic gates required for the computing system.

In the enciphering and deciphering apparatus according to the present invention, the enciphering and deciphering apparatus further comprises the coefficient acquiring unit which, based on an input integer m, acquires essentially the whole of the binomial coefficients $_iC_j(1<=i<=m, 1<=j<=i)$, and then enables the coefficient memory unit to store all of them therein.

Accordingly, in the case in which integers n and m are provided as the public key in the RSA cryptographic system, based on the integers n and m, it is possible to acquire a predetermined binomial coefficient via computations. Because of this, even when changing the public key, it is possible to easily acquire the binomial coefficient required for an enciphering operation. The same applies to the case of deciphering operation.

In the enciphering and deciphering apparatus according to the present invention, the enciphering and deciphering apparatus further comprises the input arranging unit which rearranges a plurality of the input first expressions according to the ascending order and then transmits the rearranged contents to the arithmetic operating unit; and the output arranging unit which rearranges a plurality of second expressions computed by the arithmetic operating unit in correspondence with the input sequence of the corresponding first expressions. Characteristically, the arithmetic operating unit computes an ensuing second expression availing of a group of power raising values acquired in the course of computing the immediately preceding second expression.

Accordingly, by way of computing an ensuing second expression by utilizing a group of power raising values acquired in the course of computing the immediately preceding second expression, it is possible to contract the time required for computing the following second expression. Because of this, it is possible to contract the time required for processing the whole routines whenever enciphering or deciphering a plurality of the first expressions.

The above description has explained the present invention in the form of preferred embodiments thereof. It should be understood that each of the technical terms shown therein was not used for limitation, but, they were described solely for explanatory purpose. The contents of the above description may be subject to change within the scope of the following Claims without deviating from the scope and the spirit of the present invention.

What is claimed is:

1. An enciphering and deciphering apparatus which, in a mathematic system in which modulo n of the positive integer is present, when an optional positive integer $X_k=X_{k1}$ for satisfying an equation $X_k=X_{k-1}+1(1<=k<=n-1, X_0=0)$ constitutes a first expression, based on said first expression $X_{k1}$, seeks a second expression $Y_{k1}$ defined by an equation $Y_{k1}=X_{k1}^m$ (where m is a positive integer), said apparatus comprising:

an input terminal for the input of said integers n and m and a plurality of first expressions;

a coefficient memory unit for storing binomial coefficients $_iC_j(1<=i<=m, 1<=j<=i)$;

an arithmetic operating unit which, based on an equation $X_k^i=1+\Sigma((j=1, i)_iC_j \cdot X_{k-1}^j)$, seeks said second expression $Y_{k1}$ by serially computing a group of power raising values $X_k^i$ corresponding to i=1 through m in relation to one unit of k in a range from k=k0+1 up to k=k1 based on an initial value consisting of a group of power raising values $X_{k0}^j$ corresponding to j=1 through m in relation to k−1=k0 by applying the binomial coefficient stored in said coefficient memory unit; and an output terminal for an output of said second expression $Y_{k1}$;

wherein said arithmetic operating unit further comprises a power raising value memory unit for storing a group of power raising values $X_{k-1}^j$ corresponding to j=1 through m in relation to one unit of k; said arithmetic operating unit computes a group of power raising values $X_k^i$ corresponding to i=1 through m in relation to one unit of k shown above based on said preceding equation $X_k^i=1+\Sigma((j=1, i)_iC_j \cdot X_{k-1}^j)$ by applying the binomial coefficients stored in said coefficient memory unit and the group of power raising values $X_{k-1}^j$ stored in said power raising value memory unit, and then renews the contents stored in said power raising value memory unit into a group of said newly computed power raising values $X_k^i$, wherein said arithmetic operating unit further comprises:

a coefficient selector for selecting one or more binomial coefficients required for computing a power raising value $X_k^i$ corresponding to each one unit of k and i among binomial coefficients stored in said coefficient memory unit;

a multiplier for seeking a product of said binomial coefficients selected by said coefficient selector and one or more power raising values $X_{k-1}^j$ corresponding to said selected binomial coefficients among a group of power raising values $X_{k-1}^j$ stored in said power raising value memory unit;

an adder for seeking a sum of one or more products acquired by said multiplier and a numerical value "1";

a latching unit for latching said sum acquired by said adder as a power raising value $X_k^i$ corresponding to each one unit of k and i; and a controlling unit which, by way of controlling operations of said coefficient selector, said multiplier, said adder, said latching unit, and said power raising value memory unit, serially computes a plurality of power raising values $X_k^i$ corresponding to i=1 through m in relation to said one unit of k, and then serially latches them; wherein, after causing a group of power raising values $X_k^i$ corresponding to i=1 through m in relation to said one unit of k to be fully latched, by way of transferring a group of said latched power raising values $X_k^i$ to said power raising value memory unit for storage therein, said controlling unit renews the contents stored in said power raising value memory unit into a group of the newly computed power raising values $X_k^i$, and then, by way of serially computing based on the renewed power raising values $X_k^i$ as the updated power raising values $X_{k-1}^j$, the controlling unit eventually acquires said second expression $Y_k^1$, wherein said enciphering and deciphering apparatus is used for enciphering and/or deciphering RSA ciphers.

2. The enciphering and deciphering apparatus according to claim 1, further comprising a coefficient acquiring unit which, based on said input integer m, acquires the binomial coefficients $_iC_j$ ($1 \leq i \leq m$, $1 \leq j \leq i$) and then enables said coefficient memory unit to store said acquired binomial coefficients therein.

3. The enciphering and deciphering apparatus according to claim 1, further comprising:

an input arranging unit which rearranges a plurality of first expressions being input according to an ascending order and then transmits said rearranged first expressions to said arithmetic operating unit; and an output arranging unit which rearranges a plurality of second expressions computed by said arithmetic operating unit in correspondence with the input sequence of the corresponding first expressions; wherein said arithmetic operating unit computes an ensuing second expression availing of a group of said power raising values acquired in the course of computing an immediately preceding second expression.

4. The enciphering and deciphering apparatus according to claim 2, further comprising:

an input arranging unit which rearranges a plurality of first expressions being input according to an ascending order and then transmits said rearranged first expressions to said arithmetic operating unit; and an output arranging unit which rearranges a plurality of second expressions computed by said arithmetic operating unit in correspondence with the input sequence of the corresponding first expressions; wherein said arithmetic operating unit computes an ensuing second expression availing of a group of said power raising values acquired in the course of computing an immediately preceding second expression.

* * * * *